United States Patent
Takemoto et al.

(10) Patent No.: US 12,498,420 B2
(45) Date of Patent: Dec. 16, 2025

(54) POWER SUPPLY, AND DIAGNOSTIC METHOD FOR POWER SUPPLY

(71) Applicant: Panasonic Intellectual Property Management Co., Ltd., Osaka (JP)

(72) Inventors: Kensuke Takemoto, Osaka (JP); Takeshi Nakayashiki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 18/863,159

(22) PCT Filed: Mar. 13, 2023

(86) PCT No.: PCT/JP2023/009495
§ 371 (c)(1),
(2) Date: Nov. 5, 2024

(87) PCT Pub. No.: WO2023/228522
PCT Pub. Date: Nov. 30, 2023

(65) Prior Publication Data
US 2025/0306102 A1    Oct. 2, 2025

(30) Foreign Application Priority Data
May 27, 2022 (JP) .................. 2022-086670

(51) Int. Cl.
*H02M 1/088* (2006.01)
*G01R 31/327* (2006.01)
*H02M 3/158* (2006.01)

(52) U.S. Cl.
CPC .......... *G01R 31/327* (2013.01); *H02M 1/088* (2013.01); *H02M 3/1584* (2013.01)

(58) Field of Classification Search
CPC .. G01R 31/327; H02M 1/088; H02M 3/1584; H02M 1/322; H02M 1/0003; H02M 1/32
See application file for complete search history.

(56) References Cited

U.S. PATENT DOCUMENTS

| | | | |
|---|---|---|---|
| 2020/0235664 A1* | 7/2020 | Takei | H02M 7/537 |
| 2020/0262301 A1* | 8/2020 | Sasahara | B60L 3/0046 |

(Continued)

FOREIGN PATENT DOCUMENTS

WO    2019/077958    4/2019

OTHER PUBLICATIONS

International Search Report of PCT application No. PCT/JP2023/009495 dated Apr. 25, 2023.

*Primary Examiner* — Lincoln D Donovan
*Assistant Examiner* — Alex W Lam
(74) *Attorney, Agent, or Firm* — GREENBLUM & BERNSTEIN, P.L.C.

(57) ABSTRACT

A power supply device includes a first switch having one end configured to be connected to a first DC power supply; a first capacitor connected between another end of the first switch and a reference potential; a second switch having one end configured to be connected to a second DC power supply; a second capacitor connected between another end of the second switch and the reference potential; first and second DC-DC converters connected in parallel between another end of the first switch and another end of the second switch; and a controller. The controller includes a stepping-down operation mode, a boosting operation mode, and a boosting and stepping-down operation mode. In the boosting and stepping-down operation mode, while the first switch and the second switch are turned off, the first DC-DC converter steps down a voltage of the first capacitor and output the stepped down voltage to the second capacitor, and simultaneously, the second DC-DC converter boosts a voltage of the (Continued)

second capacitor and output the boosted voltage to the first capacitor.

15 Claims, 18 Drawing Sheets

(56) References Cited

U.S. PATENT DOCUMENTS

2022/0231537 A1* 7/2022 Hirota .................. H02J 7/16
2023/0283183 A1* 9/2023 Hsiao .................. B60L 15/007
363/13

* cited by examiner

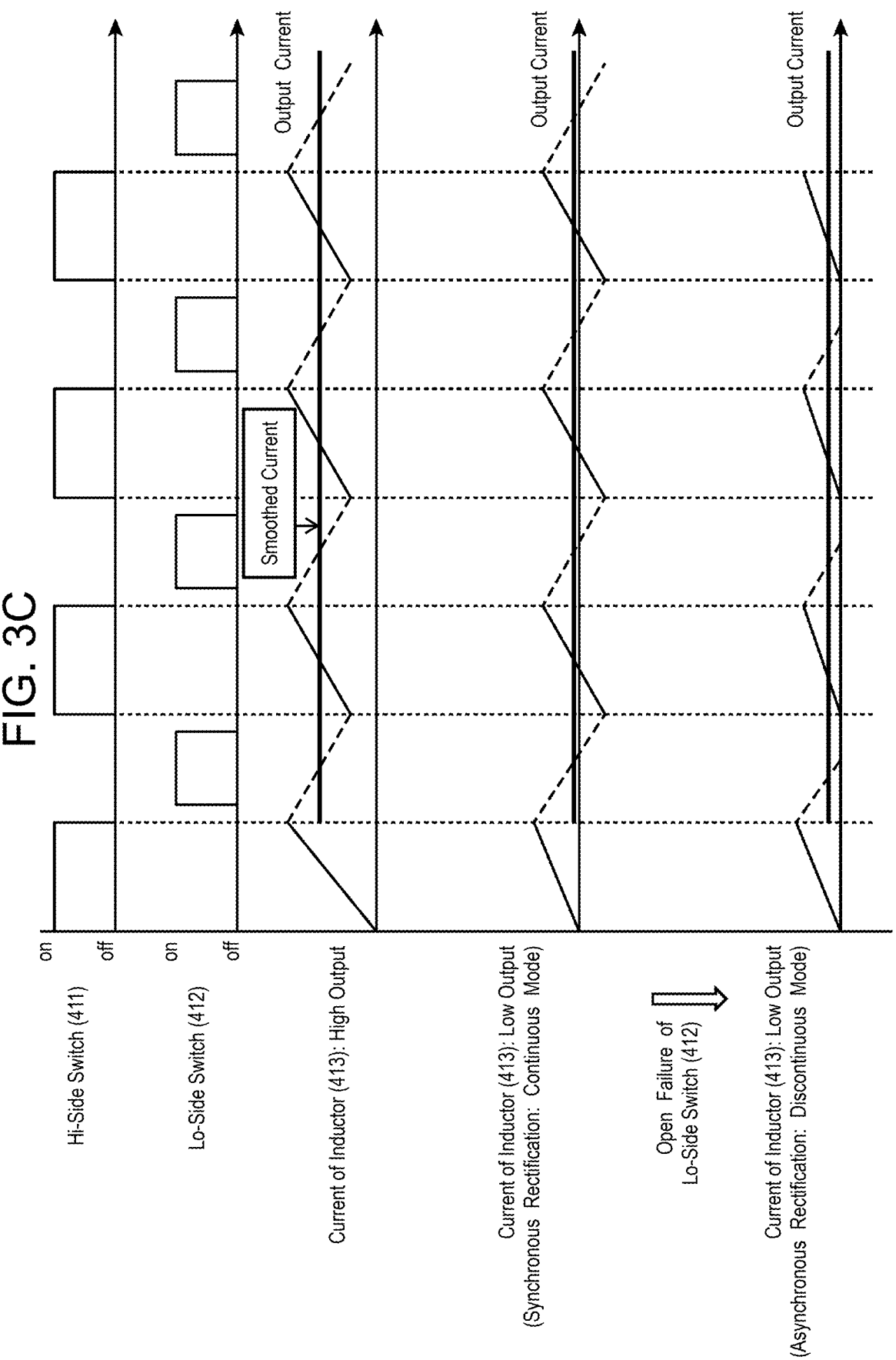

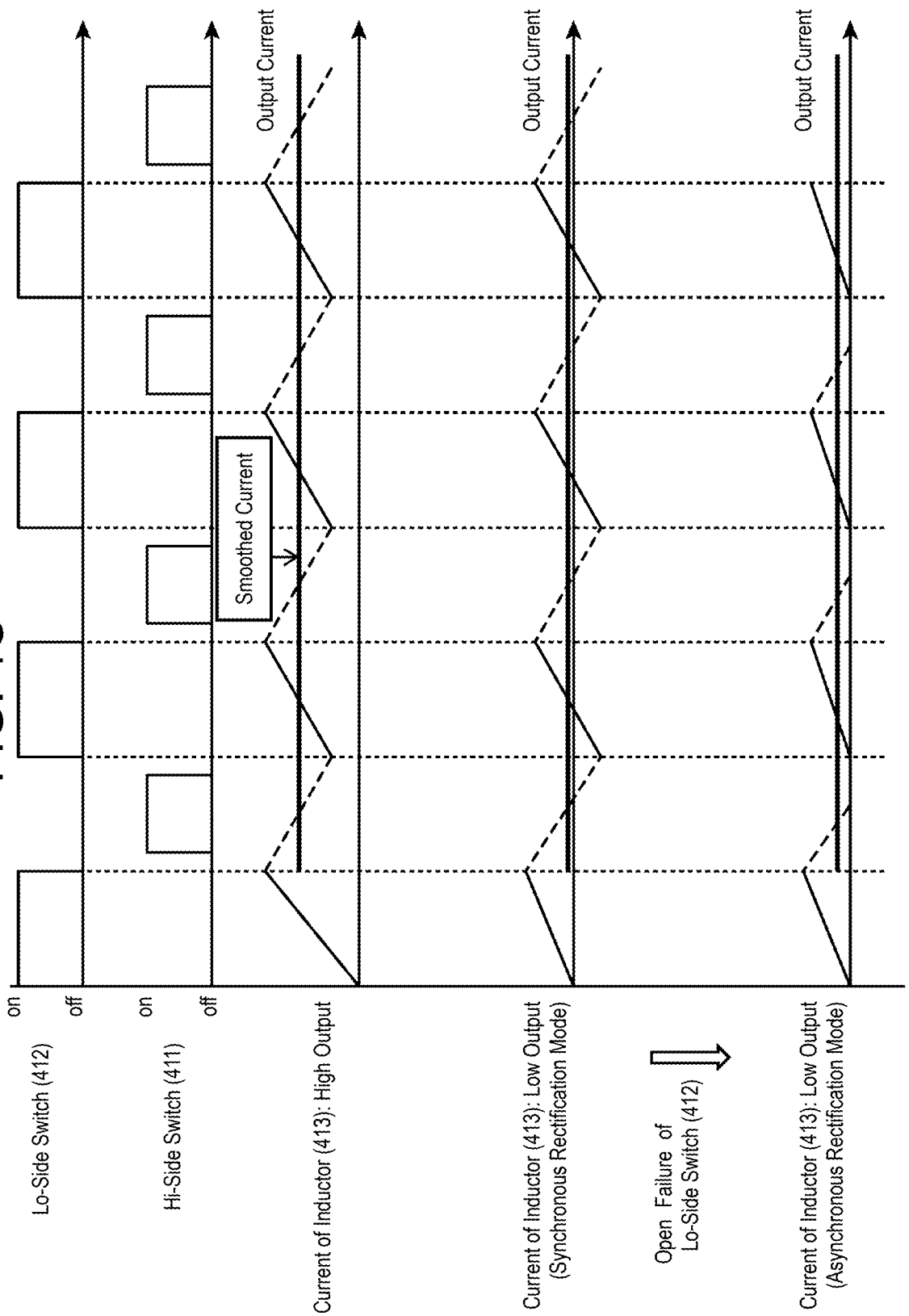

POWER SUPPLY, AND DIAGNOSTIC METHOD FOR POWER SUPPLY

TECHNICAL FIELD

The present disclosure relates to a power supply device and a method of diagnosing the power supply device, and particularly to a power supply device connected between two direct-current (DC) power supplies and configured to convert a voltage.

BACKGROUND ART

A power supply device including a DC-DC converter connected between two DC power supplies and configured to convert a voltage has been disclosed (for example, PTL 1). In such a power supply device, a switch is connected between the power supply device and each of the two DC power supplies for protection. Then, in order to diagnose a turning-off performance of the switch, while the switch is turned off, a potential difference between both ends of the switch is measured. When the potential difference is greater than a predetermined value, it is determined that the turning-off performance of the switch is be normal. When the potential difference is not greater than the predetermined value, it is determined that the turning-off performance of the switch is abnormal.

CITATION LIST

Patent Literature

PTL 1: WO 2019/077958

SUMMARY

In a conventional diagnostic method, in the case where an electric charge (hereinafter, an electric charge may be referred to as "an internal charge") is stored in a DC-DC converter, the internal charge provides an adverse effect that, after the switch is turned off, the completion of discharge of the internal charge needs to be waited, accordingly requiring a long standby time.

A power supply device according to an aspect of the present disclosure is configured to be connected to a first direct-current (DC) power supply and a second DC power supply. The first DC power supply is configured to supply and hold a first voltage. The second DC power supply is configured to supply and hold a second voltage. The second voltage is lower than the first voltage. The power supply device includes: a first switch having one end being configured to be connected to the first DC power supply; a first capacitor connected between another end of the first switch and a reference potential; a second switch having one end configured to be connected to the second DC power supply; a second capacitor connected between another end of the second switch and the reference potential; a first DC-DC converter connected between the another end of the first switch and the another end of the second switch; a second DC-DC converter connected in parallel to the first DC-DC converter between the another end of the first switch and the another end of the second switch; and a controller configured to control the first switch, the second switch, the first DC-DC converter, and the second DC-DC converter. The controller includes: a stepping-down operation mode in which, while the first switch and the second switch are turned on, a stepping-down control is performed to simultaneously cause the first DC-DC converter and the second DC-DC converter to step down the first voltage supplied from the first DC power supply to the second voltage and output the second voltage to the second DC power supply; a boosting operation mode in which, while the first switch and the second switch are turned on, a boosting control is performed to simultaneously cause the first DC-DC converter and the second DC-DC converter to boost the second voltage supplied from the second DC power supply to the first voltage and output the first voltage to the first DC power supply; and a boosting and stepping-down operation mode in which, while the first switch and the second switch are turned off, a boosting and stepping-down control is performed to cause the first DC-DC converter to step down a voltage of the first capacitor and output the stepped down voltage to the second capacitor, and simultaneously, to cause the second DC-DC converter to boost a voltage of the second capacitor and output the boosted voltage to the first capacitor.

In a method of diagnosing the power supply device according to the above aspect of the present disclosure, a power supply device is prepared. The power supply device includes a first switch having one end connected to the first DC power supply, a first capacitor connected between another end of the first switch and a reference potential, a second switch having one end connected to the second DC power supply, a second capacitor connected between another end of the second switch and the reference potential, a first DC-DC converter connected between the another end of the first switch and the another end of the second switch, and a second DC-DC converter connected between the another end of the first switch and the another end of the second switch. While the first switch and the second switch are turned off, a boosting and stepping-down control is performed to cause the first DC-DC converter to step down a voltage of the first capacitor and output the stepped down voltage to the second capacitor, and simultaneously to cause the second DC-DC converter to boost a voltage of the second capacitor and output the boosted voltage to the first capacitor.

The present disclosure provides the power supply device and the method of diagnosing the power supply device that allow making a diagnosis of the turning-off performance of switches each connected between a corresponding one of two DC power supplies and the power supply device for a shorter time than in the prior art.

BRIEF DESCRIPTION OF THE DRAWINGS

FIG. 3C is a timing chart of an operation of a first DC-DC converter for explaining an open failure of a second switching element.

FIG. 4C is a timing chart illustrating an operation of the first DC-DC converter for explaining an open failure of a first switching element.

DETAILED DESCRIPTION

Figure 1:
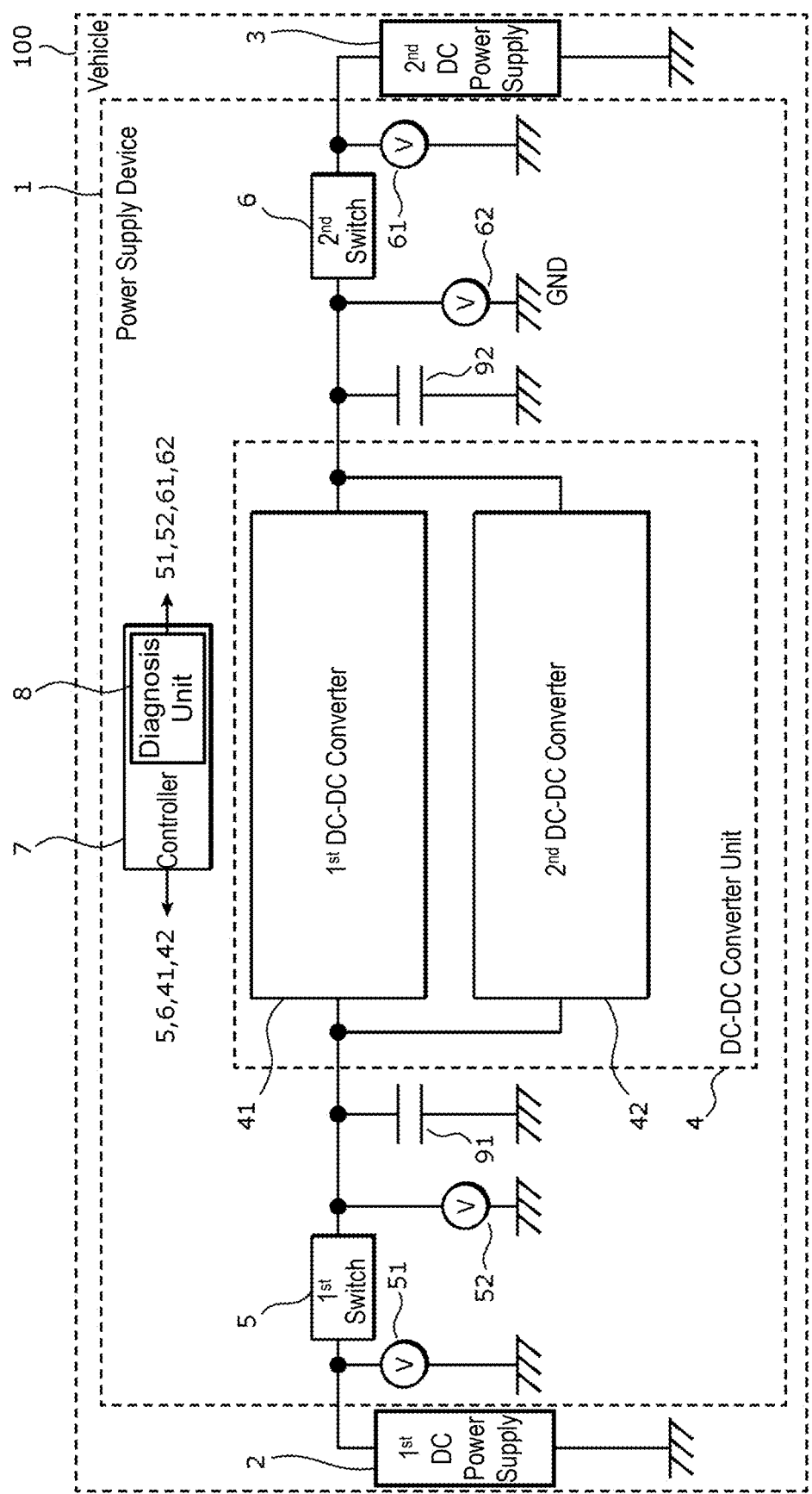
FIG. 1 is a block diagram of a power supply device according to an exemplary embodiment.

Exemplary embodiments of the present disclosure will be detailed below with reference to the drawings. Note that any of the embodiments described below indicates one specific example of the present disclosure. Any numeric value, shape, material, constituents, the arrangement and connection state of the constituents, steps, the order of the steps, and the likes illustrated in the following embodiments are merely exemplary and are not intended to limit the present disclosure. Furthermore, the drawings are not necessarily illustrated strictly. In the drawings, substantially identical constituents are assigned the same reference signs, and overlapped descriptions thereof are omitted or simplified. Furthermore, an expression "A and B are connected" means that A and B are electrically connected with each other, and includes not only a case where A and B are directly connected with each other, but also a case in which A and B are indirectly connected with each other while another circuit element is interposed between A and B.

FIG. 1 is a block diagram of power supply device 1 according to an exemplary embodiment.

Power supply device 1 is configured to be installed in vehicle 100 and connected to first DC power supply 2 configured to supply and hold a first voltage and second DC power supply 3 configured to supply and hold a second voltage lower than the first voltage. Power supply device 1 includes: first switch 5 having one end configured to be connected to first DC power supply 2; first capacitor 91 connected between another end of first switch 5 and reference potential GND (ground); second switch 6 having one end configured to be connected to second DC power supply 3; second capacitor 92 connected between another end of second switch 6 and reference potential GND; DC-DC converter unit 4 including first DC-DC converter 41 and second DC-DC converter 42 connected in parallel to each other between another end of first switch 5 and another end of second switch 6; and controller 7 including diagnosis unit 8 and configured to control first switch 5, second switch 6, and DC-DC converter unit 4.

Power supply device 1 further includes: first potential detector 51 configured to detect a voltage at one end of first switch 5; second potential detector 52 configured to detect a voltage at another end of first switch 5; third potential detector 61 configured to detect a voltage at one end of second switch 6; and fourth potential detector 62 configured to detect a voltage at another end of second switch 6.

First DC power supply 2 is, for example, a rechargeable battery. Second DC power supply 3 is, for example, a rechargeable electric double layer capacitor or battery.

First switch 5 and second switch 6 are switches configured to be turned selectively on and off, and implemented by, e.g., semiconductor switches, such as metal oxide semiconductor field effect transistors (MOSFETs), or contactors, such as electromagnetic relays.

In response to an instruction from controller 7, first DC-DC converter 41 performs a stepping-down operation to step down the first voltage supplied from first DC power supply 2 to the second voltage and output the second voltage to second DC power supply 3 and a boosting operation to boost the second voltage supplied from second DC power supply 3 to the first voltage and output the first voltage to first DC power supply 2.

In response to an instruction from controller 7, second DC-DC converter 42 performs a stepping-down operation to step down the first voltage supplied from first DC power supply 2 to the second voltage and output the second voltage to second DC power supply 3 and a boosting operation to boost the second voltage supplied from second DC power supply 3 to the first voltage and output the first voltage to first DC power supply 2.

First potential detector 51, second potential detector 52, third potential detector 61, and fourth potential detector 62 include, for example, A/D converters. First potential detector 51 and second potential detector 52 constitute a first potential-difference detector configured to detect potential difference V5 between both ends of first switch 5. Third potential detector 61 and fourth potential detector 62 constitute a second potential-difference detector configured to detect potential difference V6 between both ends of second switch 6.

Controller 7 establishes three operation modes by controlling first switch 5, second switch 6, and DC-DC converter unit 4. A first operation mode is a stepping-down operation mode in which, while first switch 5 and second switch 6 are turned on, a stepping-down control is performed to cause first DC-DC converter 41 and second DC-DC converter 42 simultaneously, that is, at the same time, to step down the first voltage supplied from first DC power supply 2 to the second voltage and output the second voltage to second DC power supply 3. A second operation mode is a boosting operation mode in which, while first switch 5 and second switch 6 are turned on, a boosting control is performed to simultaneously cause first DC-DC converter 41 and second DC-DC converter 42 to boost the second voltage supplied from second DC power supply 3 to the first voltage and output the first voltage to first DC power supply 2. A third operation mode is a boosting and stepping-down operation mode in which, while first switch 5 and second switch 6 are turned off, a boosting and stepping-down control is performed to cause first DC-DC converter 41 to step down a voltage of first capacitor 91 and output the stepped down voltage to second capacitor 92, and simultaneously to cause second DC-DC converter 42 to boost a voltage of second capacitor 92 and output the boosted voltage to first capacitor 91.

In the boosting and stepping-down operation mode, the stepping-down operation by first DC-DC converter 41 and the boosting operation by second DC-DC converter 42 may be interchanged. In other words, while first switch 5 and second switch 6 are turned off, a boosting and stepping-down control may be performed to cause first DC-DC converter 41 to boost a voltage of second capacitor 92 and output the boosted voltage to first capacitor 91, and simultaneously to cause second DC-DC converter 42 to step down a voltage of first capacitor 91 and output the stepped down voltage to second capacitor 92.

The stepping-down operation mode is a voltage conversion operation in which the first voltage supplied from first DC power supply 2 is stepped down, i.e., converted to the second voltage to charge first DC power supply 2. The boosting operation mode is a voltage conversion operation in which the second voltage supplied from second DC power supply 3 is boosted i.e., converted to the first voltage to charge first DC power supply 2. The boosting and stepping-down operation mode is an operation mode to be used for a diagnosis of the turning-off performance of first switch 5 and second switch 6 and a failure diagnosis of the switching elements included in DC-DC converter unit 4, and is also referred to as a diagnosis mode.

In the boosting and stepping-down operation mode, after the boosting and stepping-down control, in order to detect potential difference V5 between both ends of first switch 5, diagnosis unit 8 calculates first potential difference V5 which is the difference between a voltage detected by first potential detector 51 and a voltage detected by second potential detector 52, as a potential difference between both ends of first switch 5, and determines whether or not calculated first potential difference V5 is greater than a predetermined first reference potential difference. If first potential difference V5 is greater than the first reference potential difference, diagnosis unit 8 determines that the turning-off performance of first switch 5 is normal, meanwhile, if not, diagnosis unit 8 determines that the turning-off performance of first switch 5 is abnormal.

Similarly, in the boosting and stepping-down operation mode, after the boosting and stepping-down control, in order to detect potential difference V6 between both ends of second switch 6, diagnosis unit 8 calculates second potential difference V6 which is the difference between a voltage detected by third potential detector 61 and a voltage detected by fourth potential detector 62, as potential difference V6 between both ends of second switch 6, and determines whether or not calculated second potential difference V6 is greater than a predetermined second reference potential difference. If second potential difference V6 is greater than the second reference potential difference, diagnosis unit 8 determines that the turning-off performance of second switch 6 is normal. If not, diagnosis unit 8 determines that the turning-off performance of second switch 6 is abnormal.

Controller 7 and diagnosis unit 8 are implemented by a memory configured to store a program, a processor configured to execute the program, an A/D converter, and a timer.

Instead of first potential detector 51 and second potential detector 52, a first potential-difference detector configured to directly detect potential difference V5 between both ends of first switch 5 may be provided. Similarly, instead of third potential detector 61 and fourth potential detector 62, a second potential-difference detector configured to directly detect potential difference V6 between both ends of second switch 6 may be provided.

Figure 2:
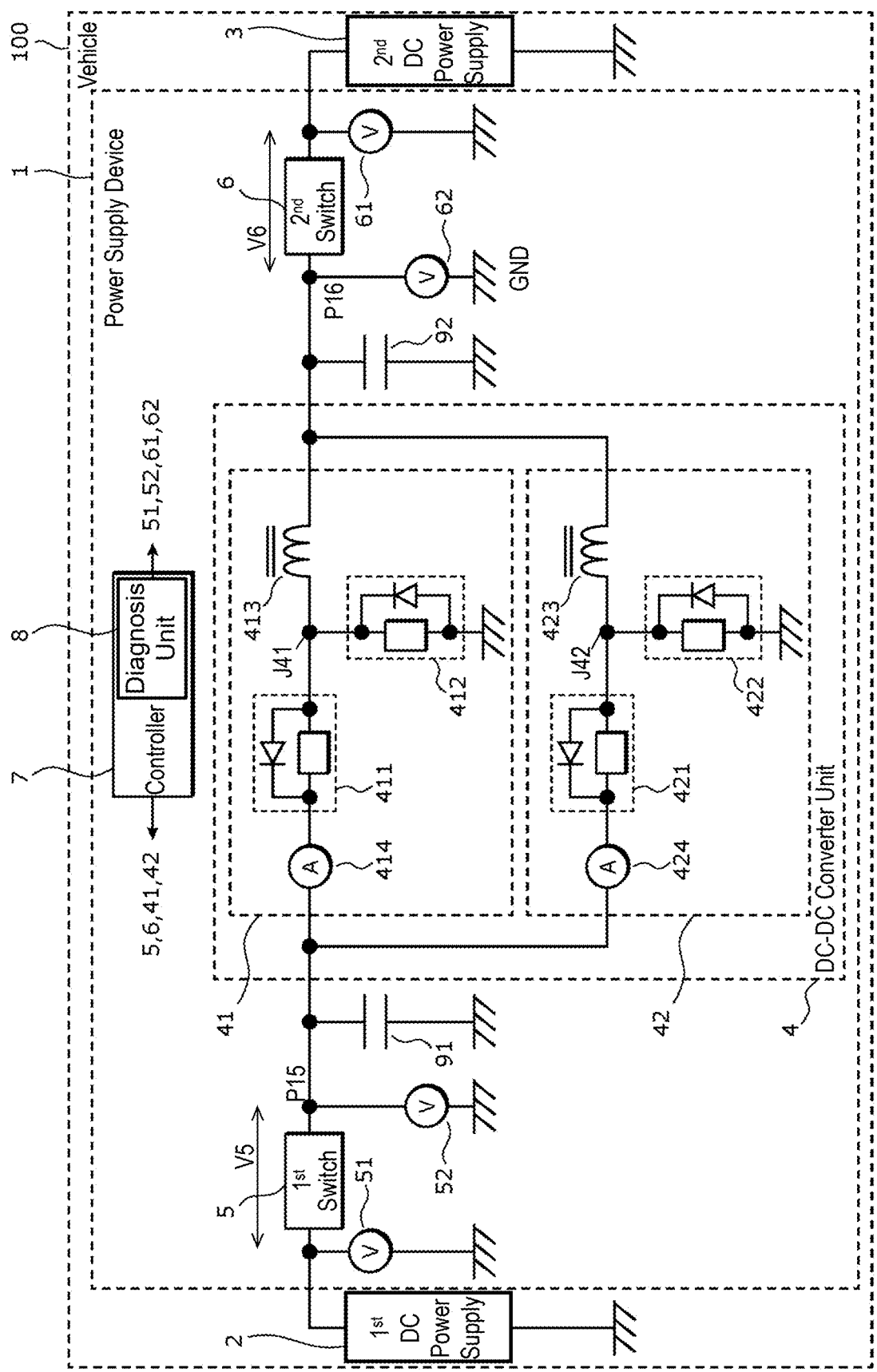
FIG. 2 is a diagram of a circuit of a DC-DC converter in the power supply device illustrated in FIG. 1.

FIG. 2 illustrates a circuit example of DC-DC converter unit 4 included in power supply device 1 illustrated in FIG. 1. An overall circuit diagram of power supply device 1 including the circuit of DC-DC converter unit 4 is illustrated.

First DC-DC converter 41 includes first current sensor 414, first switching element 411, first reactor 413, second switch 6, and second switching element 412. First current sensor 414, first switching element 411, and first reactor 413 which are connected in series to one another between first switch 5 and second switch 6. Second switching element 412 is connected between reference potential GND and node J41 at which first switching element 411 and first reactor 413 are connected in series to each other.

Second DC-DC converter 42 includes second current sensor 424, third switching element 421, second reactor 423, and fourth switching element 422. Second current sensor 424, third switching element 421, and second reactor 423 are connected in series to one another between first switch 5 and second switch 6. Fourth switching element 422 is connected between reference potential GND and node J42 at which third switching element 421 and second reactor 423 are connected in series to each other.

First current sensor 414 and second current sensor 424 are sensors configured to detect electric currents flowing through first DC-DC converter 41 and second DC-DC converter 42, respectively, and include, for example, a resistor and an A/D converter configured to convert voltages across both ends of the resistor to digital values.

First switching element 411, second switching element 412, third switching element 421, and fourth switching element 422 are, e.g., all N-channel MOSFETs each including a body diode. The body diode has an anode on the source electrode side of the switching element and a cathode on the drain electrode side thereof.

An operation of power supply device 1 described above according to the embodiment will be described below.

Figure 3A:
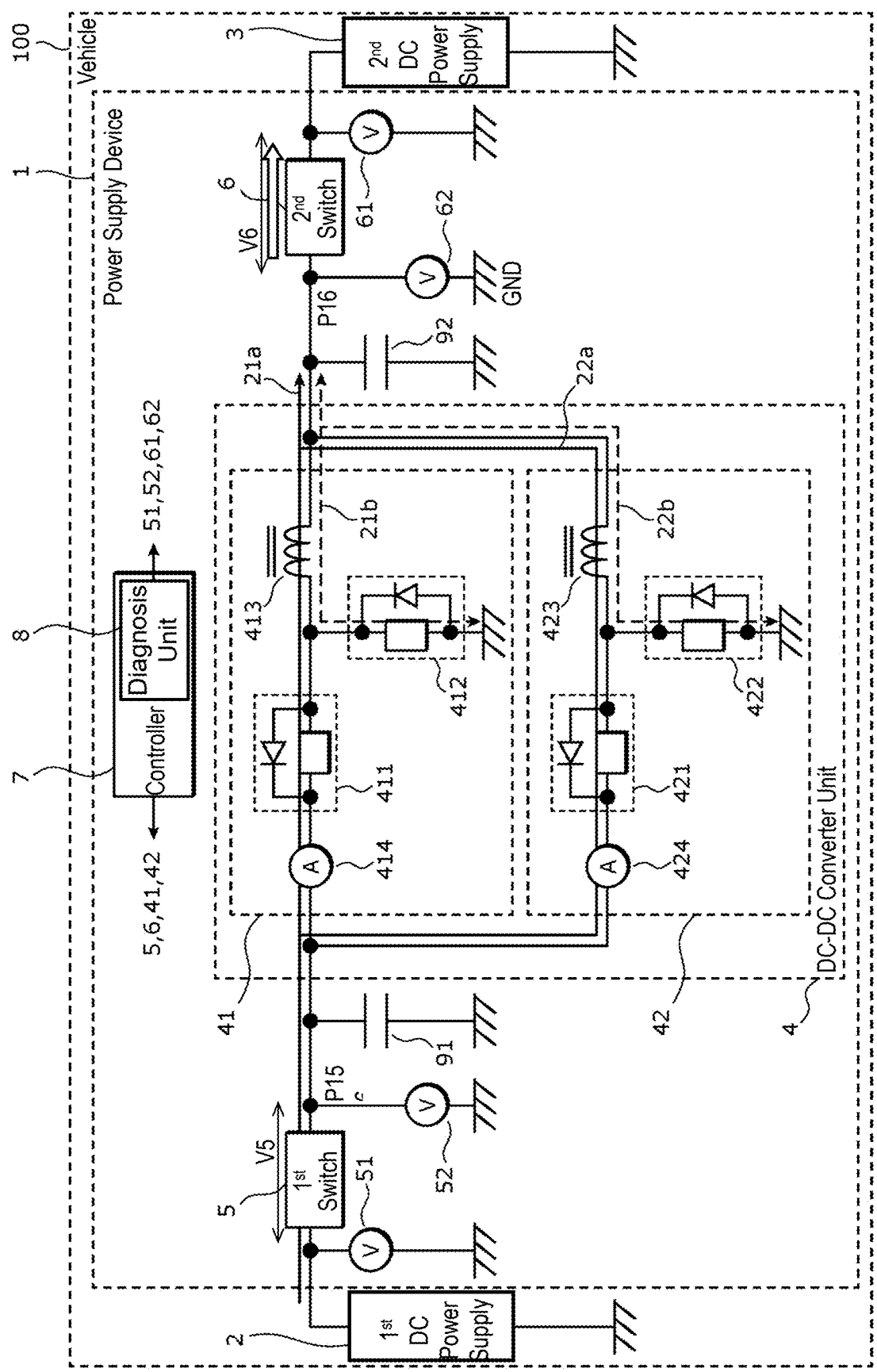
FIG. 3A illustrates an electric current flowing in a stepping-down operation mode of the power supply device illustrated in FIG. 2.

FIG. 3A illustrates the flow of an electric current in power supply device 1 illustrated in FIG. 2 in the stepping-down operation mode.

In the stepping-down operation mode, under the control of controller 7, while first switch 5 and second switch 6 are continuously turned on, first DC-DC converter 41 and second DC-DC converter 42 simultaneously perform the following operations.

In first DC-DC converter 41, first switching element 411 is turned on and second switching element 412 is turned off, and thereby, as indicated in current path 21a, an electric current supplied from first DC power supply 2 flows to second DC power supply 3 via first switch 5, first current sensor 414, first switching element 411, first reactor 413, and second switch 6, thereby storing energy in first reactor 413. Furthermore, when first switching element 411 is turned off and second switching element 412 is turned on, an thereby, as indicated in current path 21b, the energy stored in first reactor 413 is released and an electric current flows from reference potential GND to second DC power supply 3 via second switching element 412, first reactor 413, and second switch 6, and, depending on an output mode (high output or low output), an electric current flows in the opposite current path. In first DC-DC converter 41, the above-described state in which energy is stored in first reactor 413 and the above-described state in which the energy stored in first reactor 413 is released are alternately and repeatedly switched.

At this moment, controller 7 monitors a current value detected by first current sensor 414 and controls an on-duty of a pulse width modulation (PWM) control signal to be output to first switching element 411 and second switching element 412 such that the current value becomes equal to or lower than a predetermined upper limit or falls within a predetermined range. Controller 7 thus controls switching operations of first switching element 411 and second switching element 412.

In second DC-DC converter 42, third switching element 421 is turned on and fourth switching element 422 is turned off, and thereby, as indicated in current path 22a, an electric current supplied from first DC power supply 2 flows to second DC power supply 3 via first switch 5, second current sensor 424, third switching element 421, second reactor 423, and second switch 6, thereby storing energy in second reactor 423. Furthermore, third switching element 421 is turned off and fourth switching element 422 is turned on, an thereby, as indicated in current path 22b, the energy stored in second reactor 423 is released and an electric current flows from reference potential GND to second DC power supply 3 via fourth switching element 422, second reactor 423, and second switch 6, and furthermore, depending on an output mode (high output or low output), an electric current flows in the opposite current path. In second DC-DC converter 42, the above-described state in which energy is stored in second reactor 423 and the above-described state in which the energy stored in second reactor 423 is released are alternately and repeatedly switched.

At this moment, controller 7 monitors a current value detected by second current sensor 424, and controls an on-duty of a PWM control signal to be output to third switching element 421 and fourth switching element 422 such that the current value becomes equal to or lower than a predetermined upper limit or falls within a predetermined range. Controller 7 thus controls switching operations of third switching element 421 and fourth switching element 422.

As described above, in the stepping-down operation mode, first DC-DC converter 41 and second DC-DC converter 42 simultaneously perform the stepping-down operation to step down the first voltage supplied from first DC power supply 2 to the second voltage and output the second voltage to second DC power supply 3.

Figure 3B:
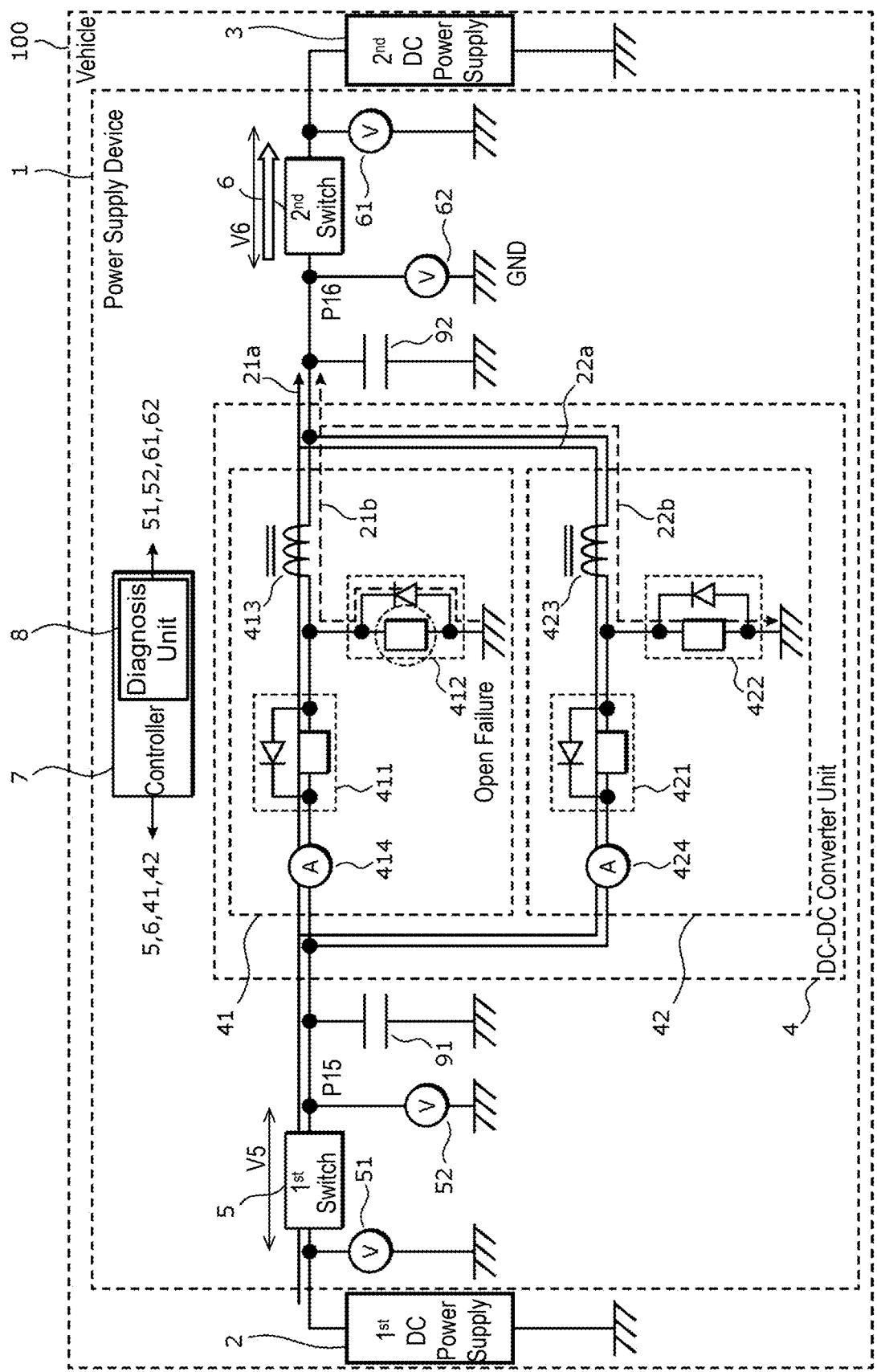
FIG. 3B illustrates a failure of a switching element in the stepping-down operation mode of the power supply device illustrated in FIG. 3A.

FIG. 3B is a diagram for explaining a failure of a switching element in the stepping-down operation mode of power supply device 1 illustrated in FIG. 3A. In FIG. 3B, the flow of an electric current when second switching element 412 has an open failure is illustrated. The open failure of a switching element means a failure in which the switching element is fixedly turned off and cannot be turned on. As illustrated in this figure, in the case where second switching element 412 has the open failure, as indicated in current path 21b, an electric current flowing toward first reactor 413 from reference potential GND via second switching element 412 is an electric current flowing through a body diode of second switching element 412 in the forward direction of the body diode, and no electric-current flows in a direction opposite to the forward direction, which results in asynchronous rectification.

FIG. 3C is a timing chart illustrating an operation of first DC-DC converter 41 for explaining the open failure of second switching element 412. In FIG. 3C, "Hi-Side Switch (411)" indicates the on/off status of first switching element 411. "Lo-Side switch (412)" indicates the on/off status of second switching element 412. "Current of Inductor (413): High Output" indicates an electric current flowing through first reactor 413 at high output. "Current of Inductor (413): Low Output (Synchronous Rectification: Continuous Mode)" indicates an electric current flowing through first reactor 413 at low output when second switching element 412 is normal. "Current of Inductor (413): Low Output (Asynchronous Rectification: Discontinuous Mode)" indicates an electric current flowing through first reactor 413 at low output when second switching element 412 has the open failure.

As shown in a current waveform of "Current of Inductor (413): Low Output (Asynchronous Rectification: Discontinuous Mode)" in FIG. 3C, even in the case where second switching element 412 has the open failure, an operation mode merely changes from synchronous rectification (continuous mode) to asynchronous rectification (discontinuous mode) at low output, and the stepping-down operation is performed.

Such phenomenon occurs also when fourth switching element 422 has the open failure in second DC-DC converter 42.

Therefore, in the stepping-down operation mode, even when the Low-side switching elements in the DC-DC converters, that is, second switching element 412 and fourth switching element 422, have the open failure, the stepping-down operation is performed, which prevents the open failure from being detected. In contrast, as described later, in a diagnosis mode, the open failure of the switching elements is detected.

Figure 4A:
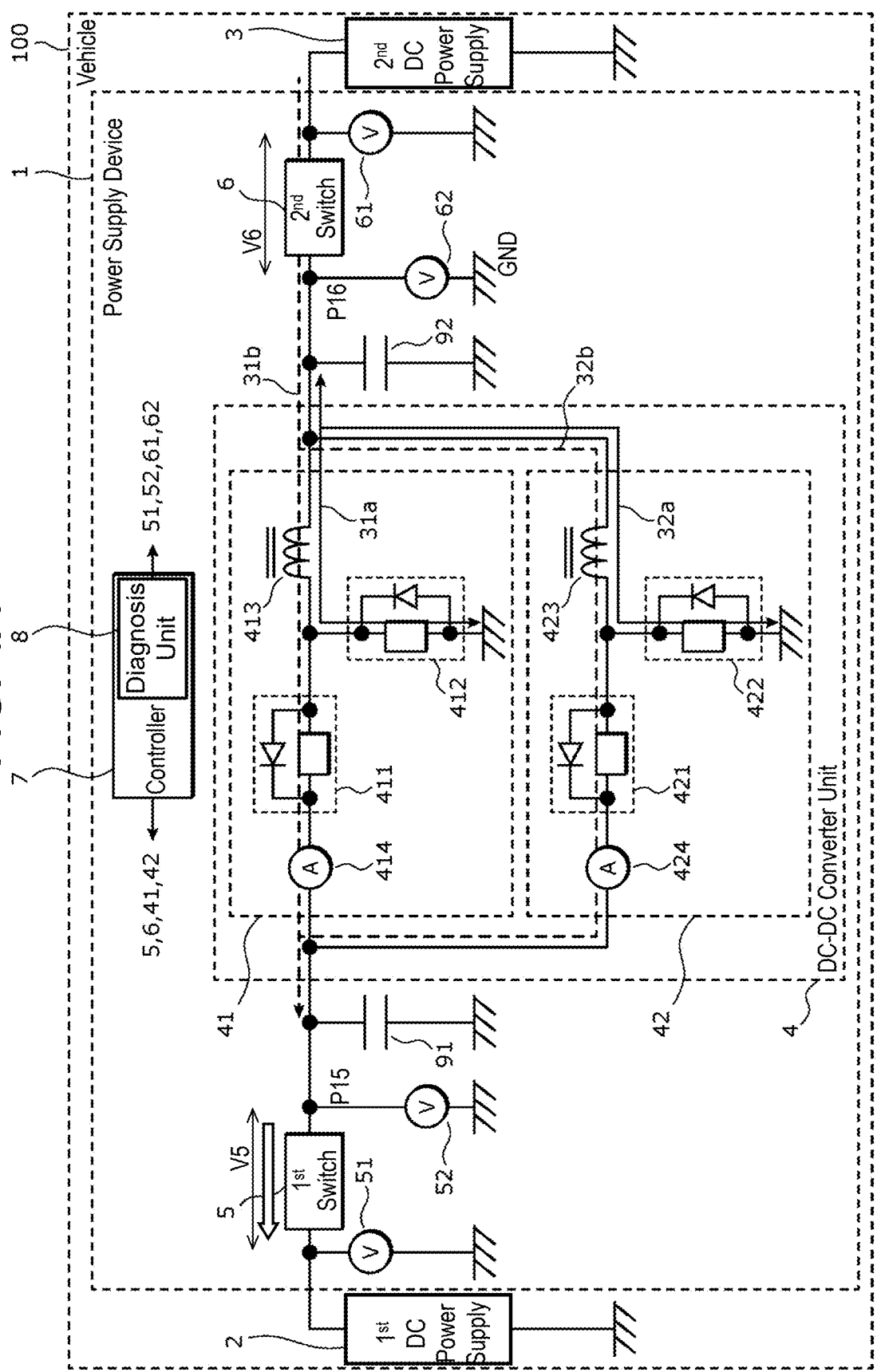
FIG. 4A is a diagram illustrating the flow of an electric current in a boosting operation mode of the power supply device illustrated in FIG. 2.

FIG. 4A illustrates the flow of an electric current in power supply device 1 illustrated in FIG. 2 in the boosting operation mode.

In the boosting operation mode under the control of controller 7, while first switch 5 and second switch 6 are continuously turned on, first DC-DC converter 41 and second DC-DC converter 42 perform the following operations simultaneously, that is, at the same time.

In first DC-DC converter 41, first switching element 411 is turned off and second switching element 412 is turned on, an thereby, as indicated in current path 31a, an electric current supplied from second DC power supply 3 flows to reference potential GND via first reactor 413 and second switching element 412, thereby storing energy in first reactor 413. In contrast, first switching element 411 is turned on and second switching element 412 is turned off, and thereby, as indicated in current path 31b, the energy stored in first reactor 413 is released, and an electric current flows from second DC power supply 3 to first DC power supply 2 via first reactor 413, first switching element 411, first current sensor 414, and first switch 5. In first DC-DC converter 41, the above-described state in which energy is stored in first reactor 413 and the above-described state in which the energy stored in first reactor 413 is released are alternately and repeatedly switched.

At this moment, controller 7 monitors a current value detected by first current sensor 414, and controls the on-duty of a PWM control signal to be outputted to first switching element 411 and second switching element 412 such that the current value becomes equal to or smaller than a predetermined upper limit or falls within a predetermined range.

Controller 7 thus controls the switching operations of first switching element 411 and second switching element 412.

In second DC-DC converter 42, third switching element 421 is turned off and fourth switching element 422 is turned on, and thereby, as indicated in current path 32*a*, an electric current supplied from second DC power supply 3 flows to reference potential GND via second reactor 423 and fourth switching element 422, thereby storing energy in second reactor 423. Furthermore, third switching element 421 is turned on and fourth switching element 422 is turned off, and thereby, as indicated in current path 32*b*, the energy stored in second reactor 423 is released, and an electric current flows from second DC power supply 3 to first DC power supply 2 via second reactor 423, third switching element 421, second current sensor 424, and first switch 5. In second DC-DC converter 42, the above-described state in which energy is stored in second reactor 423 and the above-described state in which the energy stored in second reactor 423 is released are alternately and repeatedly switched.

At this moment, controller 7 monitors a current value detected by second current sensor 424, and controls the on-duty of a PWM control signal to be outputted to third switching element 421 and fourth switching element 422 such that the current value becomes equal to or smaller than a predetermined upper limit or falls within a predetermined range. Controller 7 thus controls the switching operations of third switching element 421 and fourth switching element 422.

As described above, in the boosting operation mode, first DC-DC converter 41 and second DC-DC converter 42 simultaneously perform the boosting operation to boost the second voltage supplied from second DC power supply 3 to the first voltage and output the first voltage to first DC power supply 2.

Figure 4B:
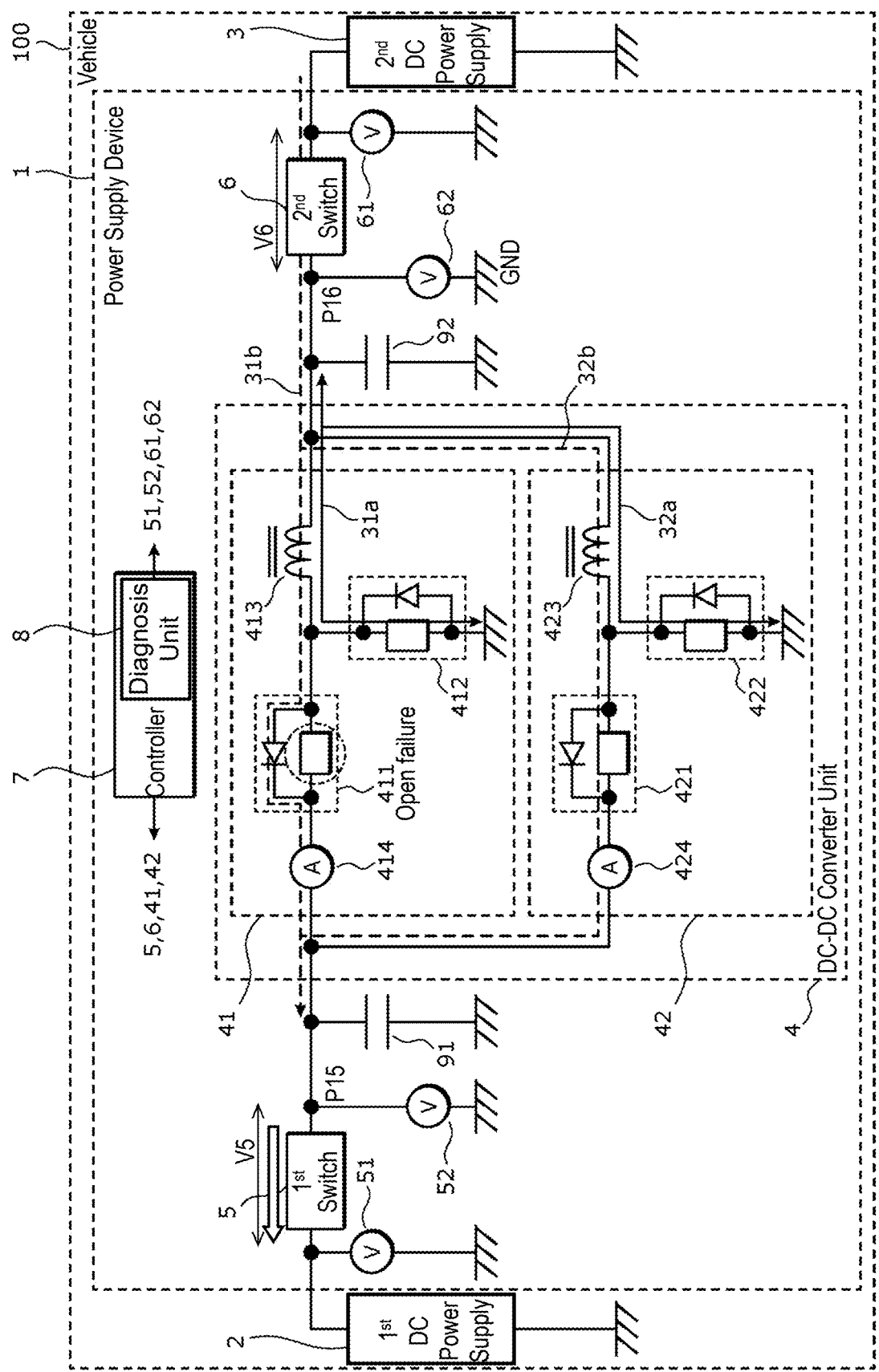
FIG. 4B is a diagram for explaining a failure of the switching element in the boosting operation mode of the power supply device illustrated in FIG. 4A.

FIG. 4B is a diagram for explaining a failure of a switching element in the boosting operation mode of power supply device 1 illustrated in FIG. 4A. In FIG. 4B, the flow of an electric current when first switching element 411 has the open failure is illustrated. As illustrated in FIG. 4B, when first switching element 411 has the open failure, an electric current flowing toward first current sensor 414 from first reactor 413 is an electric current flowing through a body diode of first switching element 411 in the forward direction of the body diode, as indicated in current path 31*b*.

FIG. 4C is a timing chart illustrating an operation of first DC-DC converter 41 for explaining the open failure of first switching element 411. In FIG. 4C, "Lo-Side Switch (412)" indicates the on/off status of second switching element 412. "Hi-Side Switch (411)" indicates the on/off status of first switching element 411. "Current of Inductor (413): High Output" indicates an electric current flowing through first reactor 413 at high output. "Current of Inductor (413): low Output (Synchronous Rectification: Continuous Mode)" indicates an electric current flowing through first reactor 413 at low output when first switching element 411 is normal. "Current of Inductor (413): Low Output (Asynchronous Rectification: Discontinuous Mode)" indicates an electric current flowing through first reactor 413 at low output when first switching element 411 has the open failure.

As shown in a current waveform of "Current of Inductor (413): Low Output (Asynchronous Rectification: Discontinuous Mode)" in FIG. 4C, even when first switching element 411 has the open failure, an operation mode merely changes from synchronous rectification (continuous mode) to asynchronous rectification (discontinuous mode) at low output, and the boosting operation is performed.

Such phenomenon occurs also when third switching element 421 has the open failure in second DC-DC converter 42.

Therefore, in the boosting operation mode, when the High-side switching elements in the DC-DC converters, that is, first switching element 411 and third switching element 421 have the open failure, the boosting operation is performed. This prevents the open failure from bring found out. In contrast, as described later, in the diagnosis mode, the open failure of the switching elements can be detected.

Figure 5A:
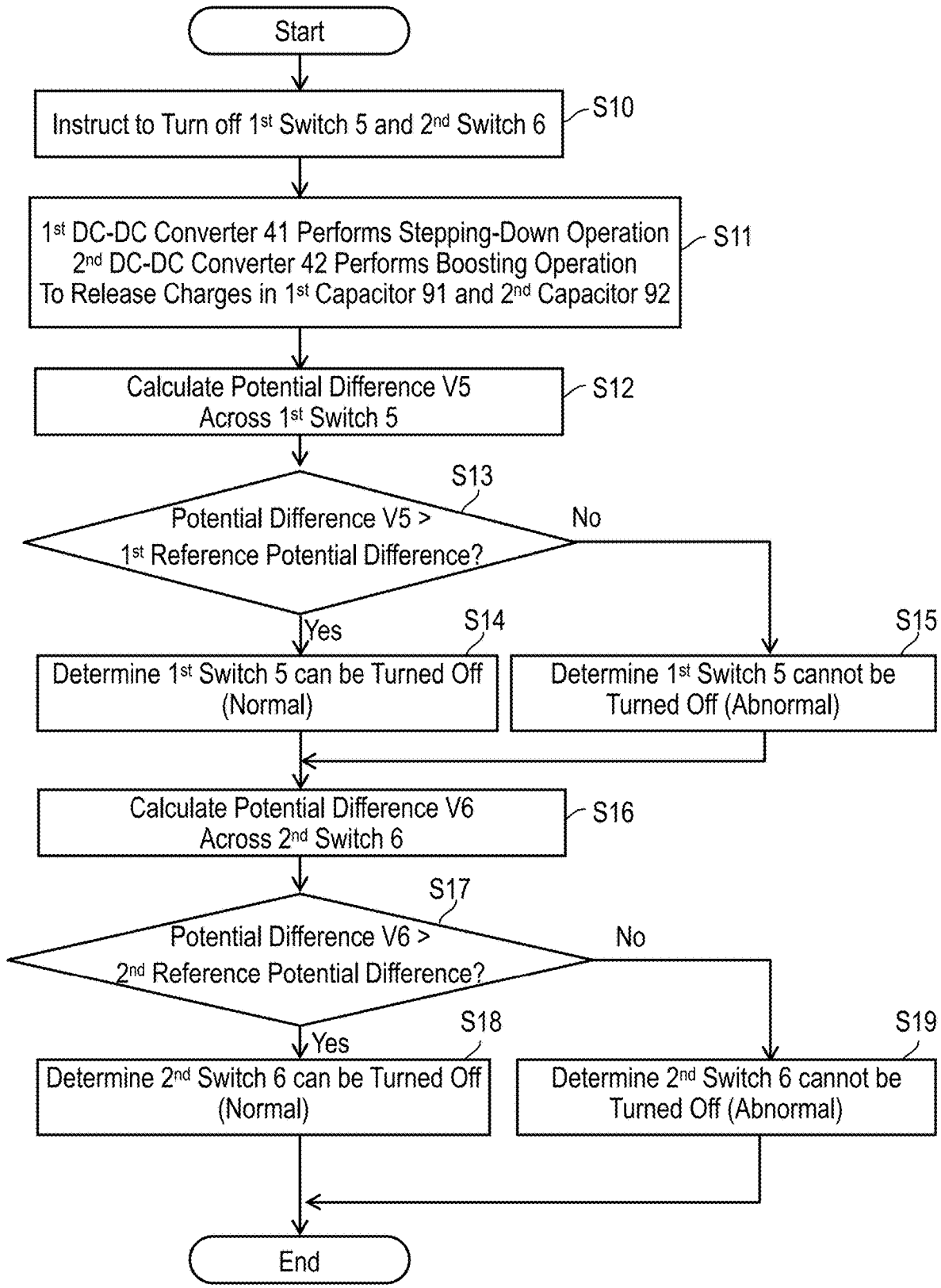
FIG. 5A is a flow chart illustrating a method of diagnosing switches of the power supply device illustrated in FIG. 2.

FIG. 5A is a flow chart illustrating a diagnostic method for switches 5 and 6 of power supply device 1 illustrated in FIG. 2.

First, controller 7 instructs first switch 5 and second switch 6 to turn off first switch 5 and second switch 6 (step S10).

Next, controller 7 causes DC-DC converter unit 4 to perform the boosting and stepping-down operation, thereby releasing an electric charge stored in first capacitor 91 and an electric charge stored in second capacitor 92 (step S11). Specifically, controller 7 causes first DC-DC converter 41 to perform the stepping-down operation for a predetermined period of time (for example, one second) and causes second DC-DC converter 42 to perform the boosting operation simultaneously, that is, at the same time, thereby releasing the electric charges stored in first capacitor 91 and second capacitor 92.

Figure 5B:
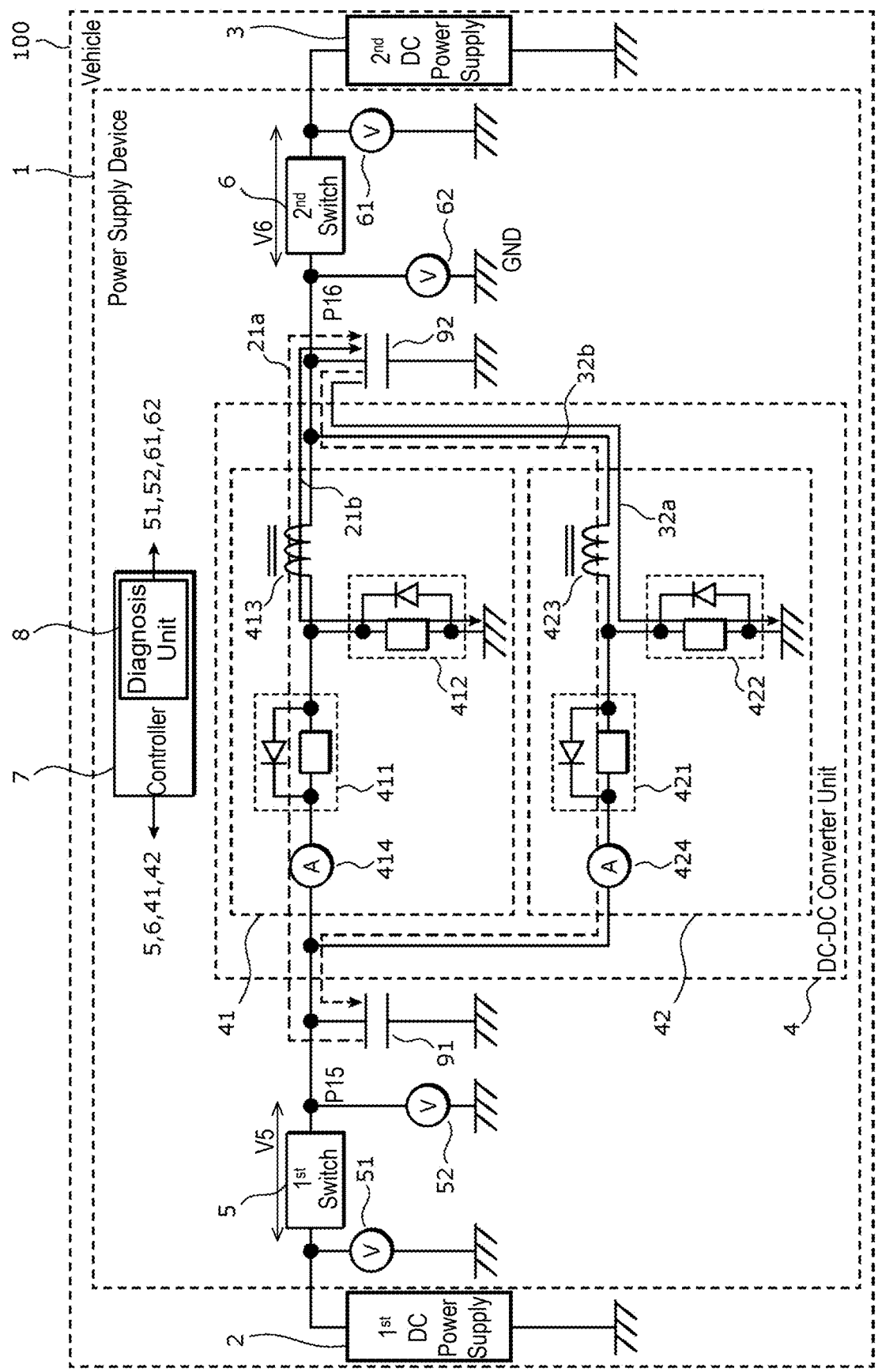
FIG. 5B illustrates an electric current in the flow chart in FIG. 5A.

FIG. 5B is a diagram illustrating the flow of an electric current at step S11 in FIG. 5A.

In first DC-DC converter 41, first switching element 411 is turned on and second switching element 412 is turned off, and thereby, as indicated in current path 21*a*, an electric charge stored in first capacitor 91 is released, and an electric current flows to second capacitor 92 via first current sensor 414, first switching element 411, and first reactor 413, thereby storing energy in first reactor 413. Furthermore, first switching element 411 is turned off and second switching element 412 is turned on, and thereby, as indicated in current path 21*b*, the energy stored in first reactor 413 is released, and an electric current flows from reference potential GND to second capacitor 92 via second switching element 412 and first reactor 413. Furthermore, depending on an output mode (at high output or low output), an electric current flows in the opposite flow direction of the current path. In first DC-DC converter 41, the above-described state in which energy is stored in first reactor 413 and the above-described state in which the energy stored in first reactor 413 is released are alternately and repeatedly switched.

Throughout the above-described stepping-down operation by first DC-DC converter 41, the electric charge stored in first capacitor 91 is released, accordingly decreasing the voltage of first capacitor 91.

In second DC-DC converter 42, third switching element 421 is turned off and fourth switching element 422 is turned on, and thereby, as indicated in current path 32*a*, an electric charge stored in second capacitor 92 is released, and an electric current flows to reference potential GND via second reactor 423 and fourth switching element 422, thereby storing energy in second reactor 423. Furthermore, third switching element 421 is turned on and fourth switching element 422 is turned off, and thereby, as indicated in current path 32*b*, the energy stored in second reactor 423 is released, and an electric current flows from second capacitor 92 to first capacitor 91 via second reactor 423, third switching element 421, and second current sensor 424. In second DC-DC converter 42, the above-described state in which energy is stored in second reactor 423 and the above-described state in which the energy stored in second reactor 423 is released are alternately and repeatedly switched.

Throughout the above-described boosting operation by second DC-DC converter 42, the electric charge stored in second capacitor 92 is released, accordingly decreasing the voltage of second capacitor 92.

At this moment, second capacitor 92 is charged by first DC-DC converter 41, and first capacitor 91 is charged by second DC-DC converter 42. However, for example, a loss caused by the on-resistance of switches 5 and 6 and a conduction loss of inductors 413 and 423 prevents first DC-DC converter 41 and second DC-DC converter 42 from having a conversion efficiency equal to or higher than 100%. Therefore, although second capacitor 92 is charged by first DC-DC converter 41 and first capacitor 91 is charged by second DC-DC converter 42, the total energy of first capacitor 91 and second capacitor 92 decreases due to a loss in first DC-DC converter 41 and second DC-DC converter 42, thereby decreasing the voltages of both first capacitor 91 and second capacitor 92.

Next, to detect potential difference V5 between both ends of first switch 5, diagnosis unit 8 of controller 7 calculates first potential difference V5 based on a voltage detected by first potential detector 51 and a voltage detected by second potential detector 52 (step S12), first potential difference V5 being the difference between these voltages, and determines whether or not calculated first potential difference V5 is greater than a predetermined first reference potential difference (step S13). If first potential difference V5 is greater than the first reference potential difference ("Yes" at step S13), diagnosis unit 8 determines that the turning-off performance of first switch 5 is normal (step S14). If first potential difference V5 is not greater than the first reference potential difference ("No" at step S13), diagnosis unit 8 determines that the turning-off performance of first switch 5 is abnormal (step S15).

Subsequently, to detect potential difference V6 between both ends of second switch 6, diagnosis unit 8 of controller 7 calculates second potential difference V6 based on a voltage detected by third potential detector 61 and a voltage detected by fourth potential detector 62 (step S16), second potential difference V6 being the difference between these voltages, and determines whether or not calculated second potential difference V6 is greater than a predetermined second reference potential difference (step S17). If second potential difference V6 is greater than the second reference potential difference ("Yes" at step S17), diagnosis unit 8 determines that the turning-off performance of second switch 6 is normal (step S18). If second potential difference V6 is not greater than the second reference potential difference ("No" step at S17), diagnosis unit 8 determines that the turning-off performance of second switch 5 is abnormal (step S19).

As described above, in the diagnosis of first switch 5 and second switch 6, after first switch 5 and second switch 6 are instructed to be turned off, the stepping-down operation by first DC-DC converter 41 releases the electric charge stored in first capacitor 91, accordingly decreasing the voltage of first capacitor 91, and, at the same time, the boosting operation by second DC-DC converter 42 releases the electric charge stored in second capacitor 92, accordingly decreasing the voltage of second capacitor 92.

Hence, compared to a power supply device of a comparative example in which the stepping-down operation by first DC-DC converter 41 and the boosting operation by second DC-DC converter 42 are not performed, when the turning-off performance of first switch 5 is normal, potential difference V5 between both ends of first switch 5 increases in a shorter time. Similarly, when the turning-off performance of second switch 6 is normal, potential difference V6 between both ends of second switch 6 increases in a shorter time. Thus, the turning-off performance of first switch 5 and the turning-off performance of second switch 6 are diagnosed at the same time in a shorter time than in the power supply device of the comparative example. In FIG. 5, the diagnosis of second switch 6 at steps S16-S19 may be performed before the diagnosis of first switch 5 at steps S12-S15.

After switches 5 and 6 are turned off and the diagnosis of switches 5 and 6 are completed, controller 7 may monitor a voltage detected by second potential detector 52 and thereby cause first DC-DC converter 41 and second DC-DC converter 42 to perform the boosting operation so as to make the voltage of first capacitor 91 closer to the original first voltage, thereby charging first capacitor 91. After potential difference V5 between both ends of first switch 5 falls within the predetermined range, first switch 5 may be turned on. This prevents an inrush current due to switching of first switch 5 from being turned off state to be turned on with large potential difference V5 between both ends of first switch 5.

Similarly, after switches 5 and 6 are turned off and the diagnosis of switches 5 and 6 are completed, controller 7 may monitor a voltage detected by fourth potential detector 62 and thereby cause first DC-DC converter 41 and second DC-DC converter 42 to perform the stepping-down operation so as to make the voltage of second capacitor 92 closer to the original second voltage, thereby charging second capacitor 92. After potential difference V6 between both ends of second switch 6 falls within the predetermined range, second switch 6 may be turned on. This prevents an inrush current due to switching of second switch 6 from being turned off to being turned on with large potential difference V6 between both ends of second switch 6.

Figure 5C:
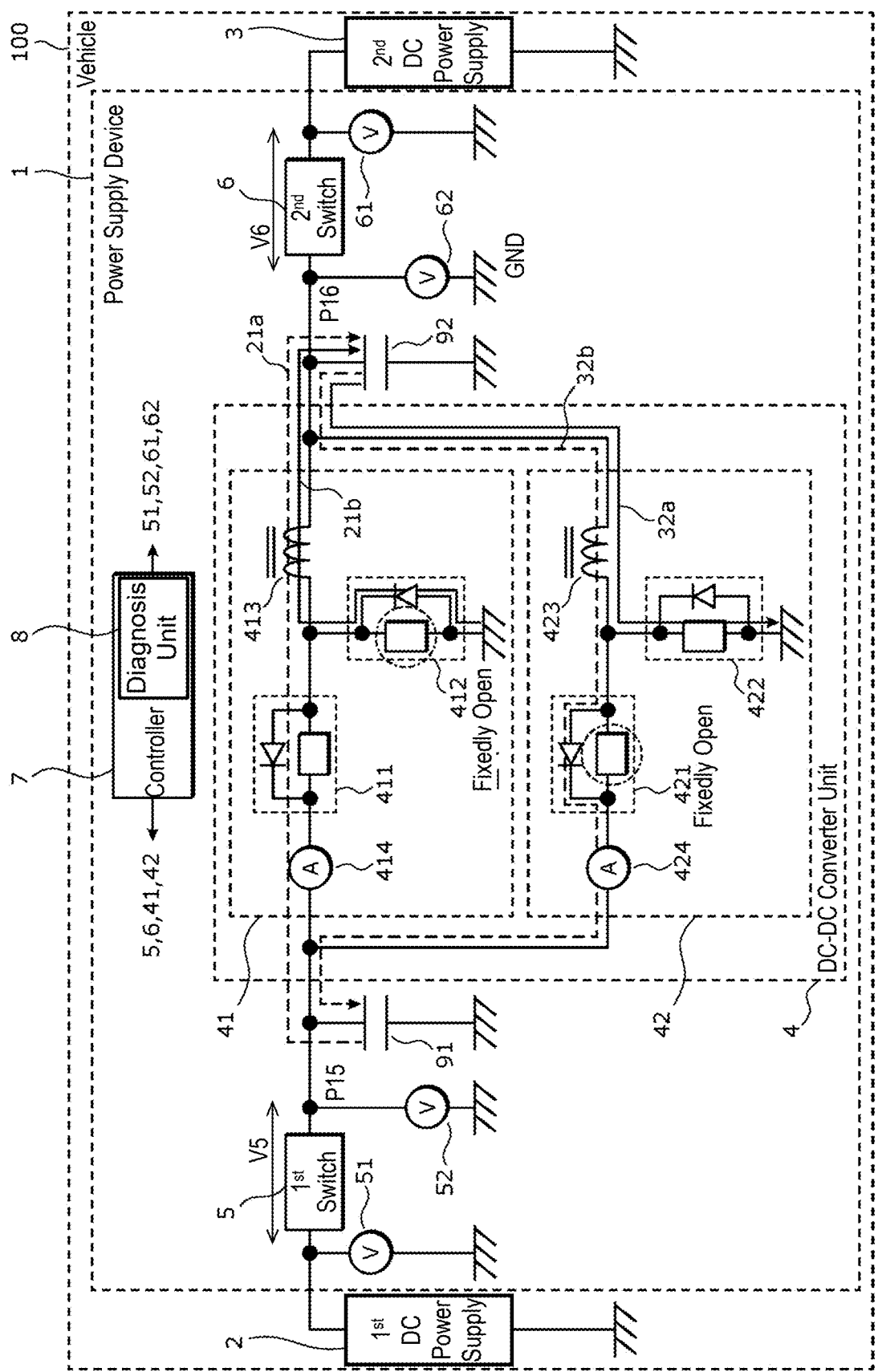
FIG. 5C illustrates a modification of the flow of an electric current in a diagnosis of the switches in the power supply device illustrated in FIG. 2.

FIG. 5C illustrates a modification of the flow of an electric current in the diagnosis of the switches in power supply device 1 illustrated in FIG. 2. In this modification, in the boosting and stepping-down operation mode, controller 7 performs the boosting and stepping-down control in which second switching element 412 and third switching element 421 are continuously turned off (hereinafter, this state is also referred to as "fixedly open").

Specifically, under the control of controller 7, in first DC-DC converter 41, first switching element 411 is turned on while second switching element 412 remains be turned off, and thereby, as indicated in current path 21a, an electric charge stored in first capacitor 91 is released and an electric current flows to second capacitor 92 via first current sensor 414, first switching element 411, and first reactor 413, thereby storing energy in first reactor 413. Furthermore, under the control of controller 7, in first DC-DC converter 41, first switching element 411 is turned off while second switching element 412 remains be turned off, and thereby, as indicated in current path 21b, energy stored in first reactor 413 is released and an electric current flows from reference potential GND to second capacitor 92 via the body diode of second switching element 412 and first reactor 413. In first DC-DC converter 41, under the control of controller 7, the above-described state in which energy is stored in first reactor 413 while second switching element 412 remains be turned off and the above-described state in which the energy stored in first reactor 413 is released are alternately and repeatedly switched.

This stepping-down operation by first DC-DC converter 41 releases the electric charge stored in first capacitor 91, accordingly decreasing the voltage of first capacitor 91.

In second DC-DC converter 42, under the control of controller 7, fourth switching element 422 is turned on while third switching element 421 remains be turned off, and thereby, as indicated in current path 32a, the electric charge stored in second capacitor 92 is released and an electric current flows to potential reference GND via second reactor 423 and fourth switching element 422, thereby storing energy in second reactor 423. Furthermore, in second DC-DC converter 42, under the control of controller 7, fourth switching element 422 is turned off while third switching element 421 remains be turned off, and thereby, as indicated in current path 32b, energy stored in second reactor 423 is released and an electric current flows from second capacitor 92 to first capacitor 91 via second reactor 423, the body diode of third switching element 421, and second current sensor 424. In second DC-DC converter 42, under the control of controller 7, the above-described state in which the energy is stored in second reactor 423 while third switching element 421 remains off and the above-described state in which the energy stored in second reactor 423 is released are alternately and repeatedly switched.

This boosting operation by second DC-DC converter 42 releases the electric charge stored in second capacitor 92, accordingly decreasing the voltage of second capacitor 92.

Compared to the prior art which performs none of the stepping-down operation by first DC-DC converter 41 and the boosting operation by second DC-DC converter 42, even in the boosting and stepping-down operation mode according to the modification, when the turning-off performance of first switch 5 is normal, potential difference V5 between both ends of first switch 5 increases in a shorter time. When the turning-off performance of second switch 6 is normal, potential difference V6 between both ends of second switch 6 increases in a shorter time. Thus, the turning-off performance of first switch 5 and the turning-off performance of second switch 6 are diagnosed at the same time in a shorter time than the prior art.

Figure 6A:
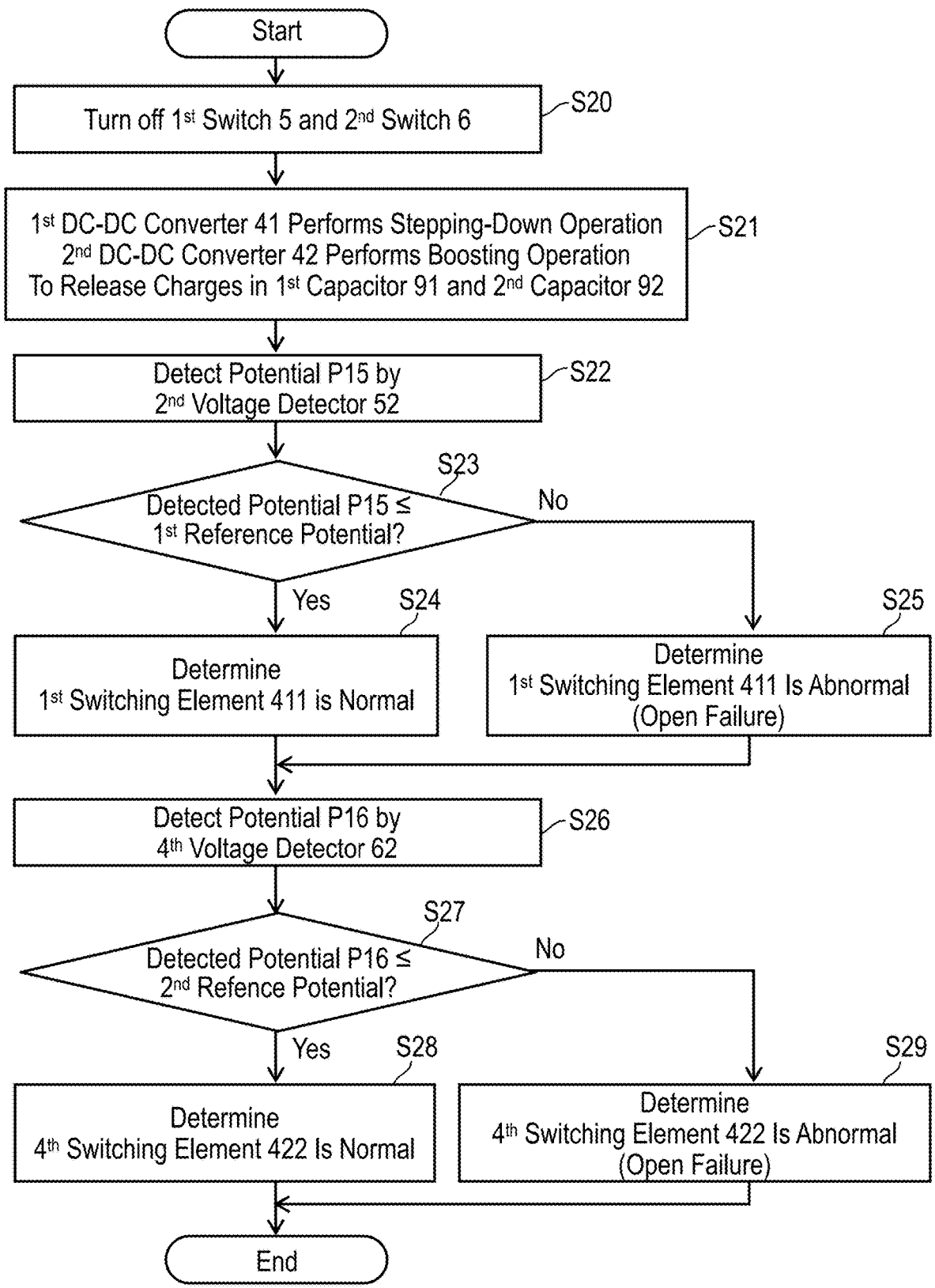
FIG. 6A is a flow chart illustrating a method for detecting failures of the switching elements in the boosting and stepping-down operation mode of the power supply device illustrated in FIG. 2.

FIG. 6A is a flow chart illustrating a method for detecting a failure of the switching elements in the boosting and stepping-down operation mode of power supply device 1 illustrated in FIG. 2.

First, controller 7 turns off first switch 5 and second switch 6 (step S20).

Next, controller 7 causes DC-DC converter unit 4 to perform the boosting and stepping-down operation, thereby releasing an electric charge stored in first capacitor 91 and an electric charge stored in second capacitor 92 (step S21). Specifically, for a predetermined period of time (e.g., one second), controller 7 causes first DC-DC converter 41 to perform the stepping-down operation, and simultaneously causes second DC-DC converter 42 to perform the boosting operation so as to release the electric charge stored in first capacitor 91 and the electric charge stored in and second capacitor 92.

Then, controller 7 detects first potential P15 by second potential detector 52 (S22) and determines whether or not first potential P15 detected by second potential detector 52 is equal to or lower than a predetermined first reference potential (step S23). If first potential P15 is equal to or lower than the first reference potential ("Yes" at step S23), controller 7 determines that first switching element 411 is normal (step S24). If first potential P15 is neither equal to nor lower than the first reference potential ("No" at step S23), controller 7 determines that first switching element 411 is abnormal (open failure) due to being fixedly turned off.

Subsequently, controller 7 detects second potential P16 by fourth potential detector 62 (S36) and determines whether or not second potential P16 detected by fourth potential detector 62 is equal to or lower than a predetermined second reference potential (step S27). If second potential P16 is equal to or lower than the second reference potential ("Yes" at step S27), controller 7 determines that fourth switching element 422 is normal (step S28). If second potential P16 is neither equal to nor lower than the second reference potential ("No" at step S27), controller 7 determines that fourth switching element 422 is abnormal (open failure) due to being fixedly turned off.

Figure 6B:
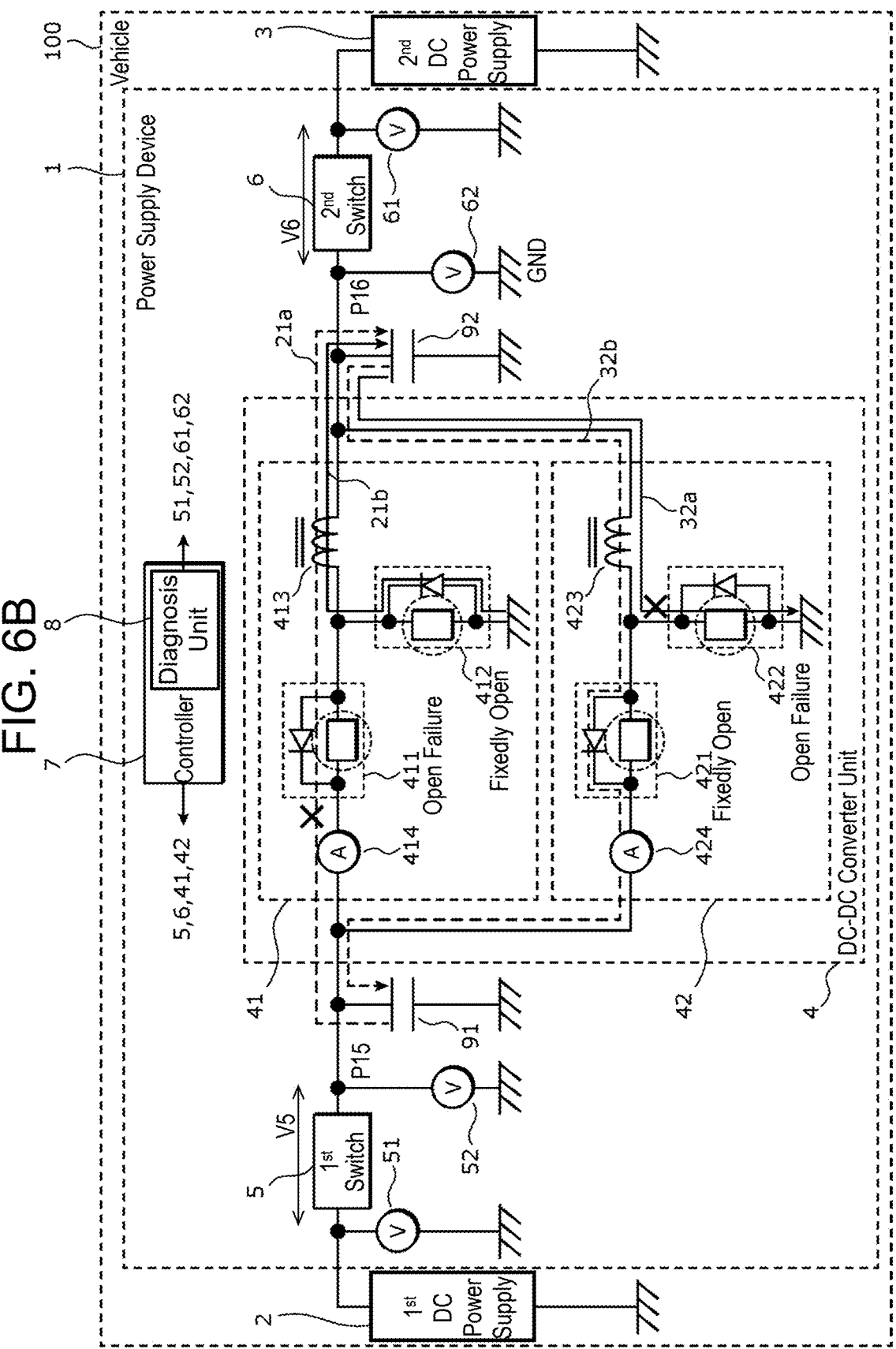
FIG. 6B is a diagram for explaining a determination basis in the flow chart in FIG. 6A.

FIG. 6B is a diagram for explaining the basis of the determination at steps S23-S25 in FIG. 6A and the basis of the determination at steps S27-S29 in FIG. 6A. Based on FIG. 5C, the difference in the flow of electric current when first switching element 411 and fourth switching element 422 have the open failure is illustrated.

In first DC-DC converter 41, when first switching element 411 is normal, as indicated in current path 21a, first switching element 411 is turned on, and thereby, an electric charge stored in first capacitor 91 is released and an electric current flows to second capacitor 92 via first current sensor 414, first switching element 411, and first reactor 413, thereby storing energy in first reactor 413. Furthermore, in first DC-DC converter 41, when first switching element 411 is normal, as indicated in current path 21b, first switching element 411 is turned off, and thereby, the energy stored in first reactor 413 is released and an electric current flows from reference potential GND to second capacitor 92 via the body diode of second switching element 412 and first reactor 413. In first DC-DC converter 41, when first switching element 411 is normal, the above-described state in which energy is stored in first reactor 413 and the above-described state in which the energy stored in first reactor 413 is released are alternately and repeatedly switched.

Thus, this stepping-down operation by first DC-DC converter 41 releases the electric charge stored in first capacitor 91, accordingly decreasing the voltage of first capacitor 91. However, when first switching element 411 has the open failure, no electric current flows in the direction from first capacitor 91 to first reactor 413 via first switching element 411. Accordingly, the stepping-down operation by first DC-DC converter 41 is not performed, and prevents the electric charge stored in first capacitor 91 from being sufficiently released. Therefore, the voltage of first capacitor 91, that is, first potential P15 detected by second potential detector 52, does not decrease sufficiently, or it takes time for first potential P15 to decrease sufficiently.

Hence, if first potential P15 detected by second potential detector 52 is neither equal to nor lower than first reference potential ("No" at step S23), controller 7 determines that first switching element 411 has the open failure (step S25).

Similarly, in second DC-DC converter 42, when fourth switching element 422 is normal, as indicated in current path 32a, fourth switching element 422 is turned on, and thereby, an electric charge stored in second capacitor 92 is released and an electric current flows to reference potential GND via second reactor 423 and fourth switching element 422, and, thereby storing energy in second reactor 423. Furthermore, in second DC-DC converter 42, when fourth switching element 422 is normal, as indicated in current path 32b, fourth switching element 422 is turned off, and thereby, the energy stored in second reactor 423 is released and an electric current flows from second capacitor 92 to first capacitor 91 via second reactor 423, the body diode of third switching element 421, and second current sensor 424. In second DC-DC converter 42, when fourth switching element 422 is normal, the above-described state in which the energy is stored in second reactor 423 and the above-described state in which the energy stored in second reactor 423 is released are alternately and repeatedly switched.

This boosting operation by second DC-DC converter 42 releases the electric charge stored in second capacitor 92, accordingly decreasing the voltage of second capacitor 92. However, when fourth switching element 422 has the open failure, no electric current flows in the direction from second capacitor 92 to reference potential GND via second reactor 423 and fourth switching element 422. Accordingly, the boosting operation by second DC-DC converter 42 is not performed, and prevents the electric charge stored in second capacitor 92 from being sufficiently released. Therefore, the voltage of second capacitor 92, that is, second potential P16 detected by fourth potential detector 62, does not decrease sufficiently, or it takes time for second potential P16 to decrease sufficiently.

Hence, if second potential P16 detected by fourth potential detector 62 is neither equal to nor lower than the second reference potential ("No" at step S27), controller 7 determines that fourth switching element 422 has the open failure (step S29).

Thus, the boosting and stepping-down operation mode (diagnosis mode) allows the diagnosis of the turning-off performance of first switch 5 and second switch 6, and, at the same time, allows the diagnosis of the open failures of first switching element 411 and fourth switching element 422.

In the method for detecting failures of the switching elements in the boosting and stepping-down operation mode illustrated in FIG. 6A, the stepping-down operation by first DC-DC converter 41 and the boosting operation by second DC-DC converter 42 may be interchanged. In other words, the boosting and stepping-down control may be performed, in which, while first switch 5 and second switch 6 are turned off, first DC-DC converter 41 boosts a voltage of second capacitor 92 and output the boosted voltage to first capacitor 91, and simultaneously, second DC-DC converter 42 steps down a voltage of first capacitor 91 and output the stepped down voltage to second capacitor 92.

Figure 6C:
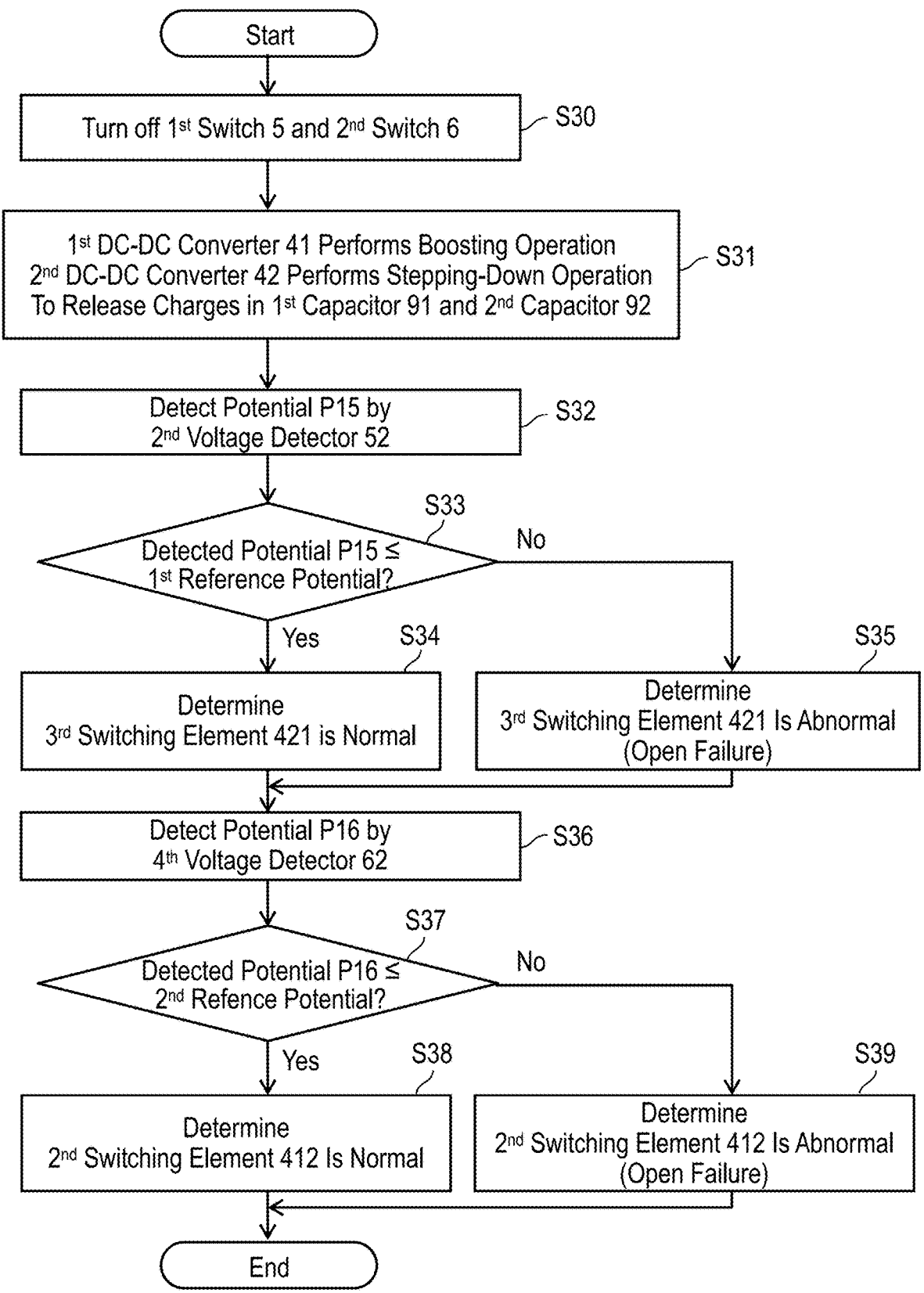
FIG. 6C is a flowchart illustrating a method for detecting failures of the switching elements in the boosting/stepping-down operation mode of the power supply device illustrated in FIG. 2, in which the stepping-down operation by the first DC-DC converter and the boosting operation by the second DC-DC converter in the boosting and stepping-down operation mode illustrated in FIG. 6A are interchanged.

FIG. 6C is a flowchart illustrating a method for detecting failures of the switching elements in the boosting and stepping-down operation mode of power supply device 1 illustrated in FIG. 2, in which the stepping-down operation by first DC-DC converter and the boosting operation by second DC-DC converter in the boosting and stepping-down operation mode illustrated in FIG. 6A are interchanged.

First, controller 7 turns off first switch 5 and second switch 6 (step S30).

Next, controller 7 causes DC-DC converter unit 4 to perform the boosting and stepping-down operation, thereby releasing an electric charge stored in first capacitor 91 and an electric charge stored in second capacitor 92 (step S31). Specifically, for a predetermined period of time (for example, one second), controller 7 causes first DC-DC converter 41 to perform the boosting operation, and simultaneously causes second DC-DC converter 42 to perform the stepping-down operation, thereby releasing the electric charge stored in first capacitor 91 and the electric charge stored in second capacitor 92.

Then, controller 7 detects first potential P15 by second potential detector 52 (step S32) and determines whether or not first potential P15 detected by second potential detector 52 is equal to or lower than a predetermined first reference potential (step S33). If first potential P15 is equal to or lower than the first reference potential ("Yes" at step S33), controller 7 determines that third switching element 421 is normal (step S34). If first potential P15 is neither equal to nor lower than the first reference potential ("No" at step S33), controller 7 determines that third switching element 421 is abnormal (open failure) because of being fixed at an off state.

Subsequently, controller 7 detects second potential P16 by fourth potential detector 62 (step S36) and determines whether or not second potential P16 detected by fourth potential detector 62 is equal to or lower than a predetermined second reference potential (step S37). If second potential P16 is equal to or lower than the second reference potential ("Yes" at step S37), controller 7 determines that second switching element 412 is normal (step S38). If second potential P16 is neither equal to nor lower than the second reference potential ("No" at step S37), controller 7 determines that second switching element 412 is abnormal (open failure) due to being fixedly turned off.

Figure 6D:
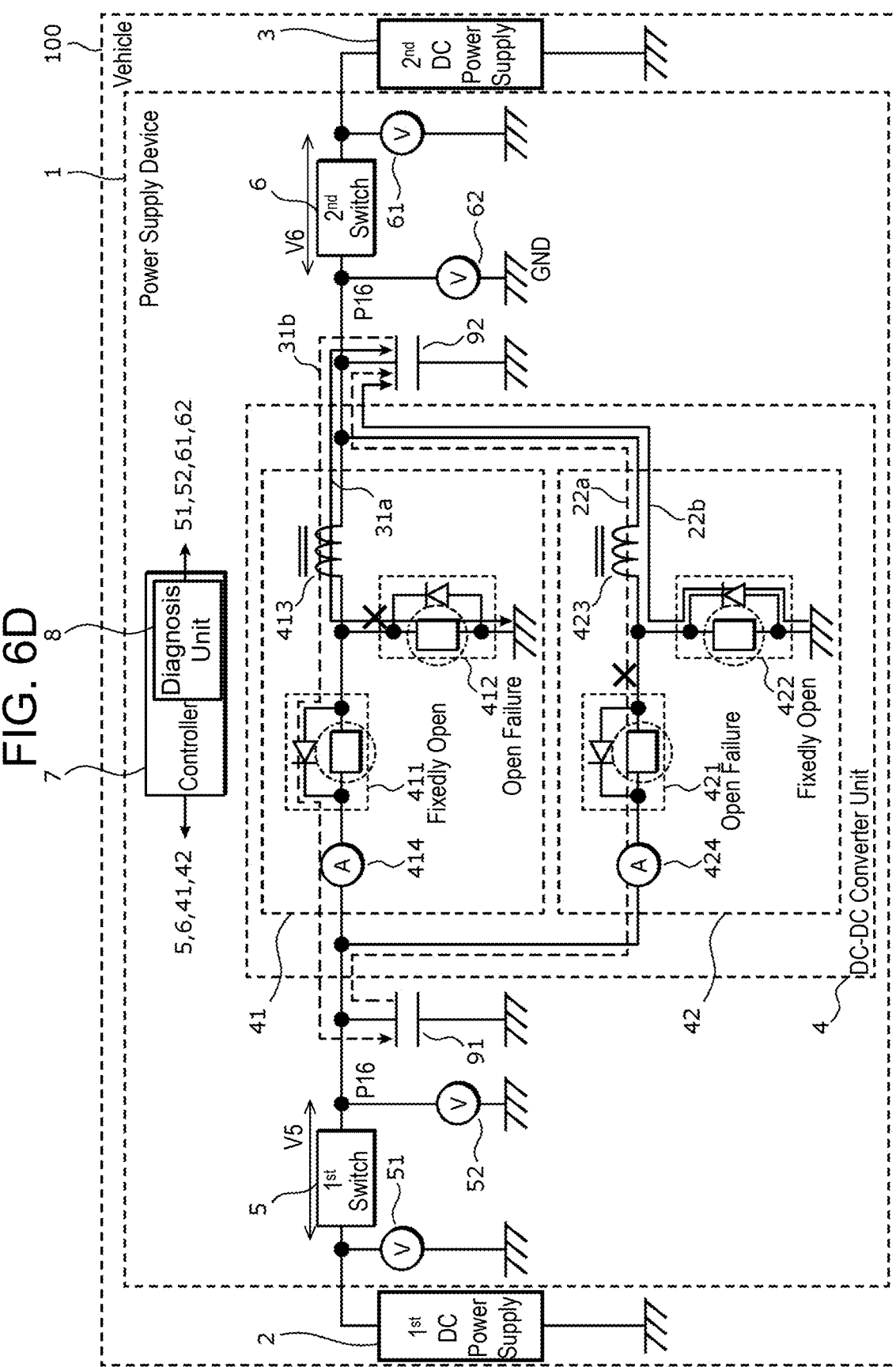
FIG. 6D is a diagram for explaining a determination basis in the flow chart in FIG. 6C.

FIG. 6D is a diagram for explaining the basis of determination at steps S33-S35 in FIG. 6C and the basis of determination at steps S37-S39 in FIG. 6C. Based on FIG. 5C, the difference in the flow of electric current when second switching element 412 and third switching element 421 have the open failures is illustrated.

In second DC-DC converter 42, when third switching element 421 is normal, as indicated in current path 22a, third switching element 421 is turned on, and thereby, an electric charge stored in first capacitor 91 is released and an electric current flows to second capacitor 92 via second current sensor 424, third switching element 421, and second reactor 423, thereby storing energy in second reactor 423. Furthermore, in second DC-DC converter 42, when third switching element 421 is normal, as indicated in current path 22b, third switching element 421 is turned off, and thereby energy stored in second reactor 423 is released and an electric current flows from reference potential GND to second capacitor 92 via the body diode of fourth switching element 422 and second reactor 423. In second DC-DC converter 42, when third switching element 421 is normal, the above-described state in which energy is stored in second reactor 423 and the above-described state in which the energy stored in second reactor 423 is released are alternately and repeatedly switched.

Thus, this stepping-down operation by second DC-DC converter 42 releases the electric charge stored in first capacitor 91, accordingly decreasing the voltage of first capacitor 91. However, when third switching element 421 has the open failure, no electric current flows in the direction from first capacitor 91 toward second reactor 423 via third switching element 421. Accordingly, the stepping-down operation by second DC-DC converter 42 is not performed, and prevents the electric charge stored in first capacitor 91 from being sufficiently released. Therefore, the voltage of first capacitor 91, that is, first potential P15 detected by second potential detector 52, does not decrease sufficiently, or it takes time for first potential P15 to decrease sufficiently.

Hence, if first potential P15 detected by second potential detector 52 is neither equal to nor lower than first reference potential ("No" at step S33), controller 7 determines that third switching element 421 has the open failure (step S35).

Similarly, in first DC-DC converter 41, when second switching element 412 is normal, as indicated in current path 31a, second switching element 412 is turned on, and thereby, an electric charge stored in second capacitor 92 is released and an electric current flows to reference potential GND via first reactor 413 and second switching element 412, thereby storing energy in first reactor 413. Furthermore, in first DC-DC converter 41, when second switching element 412 is normal, as indicated in current path 31*b*, second switching element 412 is turned off, and thereby energy stored in first reactor 413 is released and an electric current flows from second capacitor 92 to first capacitor 91 via first reactor 413, the body diode of first switching element 411, and first current sensor 414. In first DC-DC converter 41, when second switching element 412 is normal, the above-described state in which energy is stored in first reactor 413 and the above-described state in which the energy stored in first reactor 413 is released are alternately and repeatedly switched.

This boosting operation by first DC-DC converter 41 releases the electric charge stored in second capacitor 92, accordingly decreasing the voltage of second capacitor 92. However, when second switching element 412 has the open failure, no electric current flows in the direction from second capacitor 92 toward reference potential GND via first reactor 413 and second switching element 412. Accordingly, the boosting operation by first DC-DC converter 41 is not performed, and prevents the electric charge stored in second capacitor 92 from being sufficiently released. Therefore, the voltage of second capacitor 92, that is, second potential P16 detected by fourth potential detector 62, does not decrease sufficiently, or it takes time for second potential P16 to decrease sufficiently.

Hence, if second potential P16 detected by fourth potential detector 62 is neither equal to nor lower than the second reference potential ("No" at step S37), controller 7 determines that the open failure of second switching element 412 has occurred (step S39).

Thus, the boosting and stepping-down operation mode (diagnosis mode) allows the diagnosis of the turning-off performance of first switch 5 and second switch 6, and, at the same time, allows the diagnosis of the open failures of second switching element 412 and third switching element 421.

As described above, power supply device 1 according to the embodiment is configured to be connected to first DC power supply 2 configured to supply and hold the first voltage and second DC power supply 3 configured to supply and hold the second voltage lower than the first voltage. Power supply device 1 includes: first switch 5 having one end connected to first DC power supply 2; first capacitor 91 connected between another end of first switch 5 and reference potential GND; second switch 6 having one end connected to second DC power supply 3; second capacitor 92 connected between another end of second switch 6 and reference potential GND; DC-DC converter unit 4 including first DC-DC converter 41 and second DC-DC converter 42 connected in parallel to each other between another end of first switch 5 and another end of second switch 6; and controller 7 configured to control first switch 5, second switch 6, and DC-DC converter unit 4. Controller 7 includes: the stepping-down operation mode in which, while first switch 5 and second switch 6 are turned on, a stepping-down control is performed to simultaneously cause first DC-DC converter 41 and second DC-DC converter 42 to step down the first voltage supplied from first DC power supply 2 to the second voltage and output the second voltage to second DC power supply 3; the boosting operation mode in which, while first switch 5 and second switch 6 are turned on, a boosting control is performed to simultaneously cause first DC-DC converter 41 and second DC-DC converter 42 to boost the second voltage supplied from second DC power supply 3 to the first voltage and output the first voltage to first DC power supply 2; and the boosting and stepping-down operation mode (diagnosis mode) in which, while first switch 5 and second switch 6 are turned off, a boosting and stepping-down control is performed to cause first DC-DC converter 41 to step down a voltage of first capacitor 91 and output the stepped down voltage to second capacitor 92, and simultaneously to cause second DC-DC converter 42 to boost a voltage of second capacitor 92 and output the boosted voltage to first capacitor 91.

In the diagnosis mode, while first switch 5 and second switch 6 are turned off, first DC-DC converter 41 steps down a voltage of first capacitor 91 and outputs the stepped down voltage to second capacitor 92, and simultaneously, second DC-DC converter 42 boosts a voltage of second capacitor 92 and outputs the boosted voltage to first capacitor 91. When the turning-off performance of first switch 5 is normal, potential difference V5 between both ends of first switch 5 increases in a short time. When the turning-off performance of second switch 6 is normal, potential difference V6 between both ends of second switch 6 increases in a short time. As a result, the turning-off performance of first switch 5 and the turning-off performance of second switch 6 are diagnosed at the same time in a shorter time than in the prior art.

Power supply device 1 includes: the first potential-difference detector configured to detect potential difference V5 between both ends of first switch 5; and the second potential-difference detector configured to detect potential difference V6 at both ends of second switch 6. In the boosting and stepping-down operation mode, after the boosting and stepping-down control, controller 7 determines whether or not first potential difference V5 detected by the first potential-difference detector is greater than a first reference potential difference. When first potential difference V5 is greater than the first reference potential difference, controller 7 determines that first switch 5 is normal, meanwhile, when first potential difference V5 is not greater than the first reference potential difference, controller 7 determines that first switch 5 is abnormal and cannot be turned off. Furthermore, in the boosting and stepping-down operation mode, after the boosting and stepping-down control, controller 7 determines whether or not second potential difference V6 detected by the second potential-difference detector is greater than a second reference potential difference. When second potential difference V6 is greater than the second reference potential difference, controller 7 determines that second switch 6 is normal, meanwhile, when second potential difference V6 is not greater than the second reference potential difference, controller 7 determines that second switch 6 is abnormal and cannot be turned off.

In the boosting and stepping-down operation mode, after first switch 5 and second switch 6 are turned off, controller 7 may perform a stepping-down operation by first DC-DC converter 41 and a boosting operation by second DC-DC converter 42 for a predetermined period of time. This configuration causes potential difference V6 between both ends of first switch and both ends of second switch 6 to be an appropriate value.

First DC-DC converter 41 may include: first switching element 411 and first reactor 413 which are connected in series to each other between first switch 5 and second switch 6; and second switching element 412 connected between reference potential GND and node J41 at which first switching element 411 and first reactor 413 are connected in series to each other. Switching element 412 includes a body diode.

Second DC-DC converter 42 may include: third switching element 421 and second reactor 423 which are connected in series to each other between first switch 5 and second switch 6; and fourth switching element 422 connected between reference potential GND and node J42 at which third switching element 421 and second reactor 423 are connected in series to each other. Third switching element 421 includes a body diode First DC-DC converter 41 and second DC-DC converter 42 thus have simple circuit configurations.

In the boosting and stepping-down operation mode, controller 7 may perform the boosting and stepping-down control while second switching element 412 and third switching element 421 are continuously turned off. In the boosting and stepping-down operation mode, an electric current flows through the body diodes of second switching element 412 and third switching element 421, accordingly allowing more power to be consumed. Therefore, the turning-off performance of first switch 5 and the turning-off performance of second switch 6 are diagnosed in a shorter time.

First DC-DC converter 41 and second DC-DC converter 42 may include first current sensor 414 and second current sensor 424 configured to detect electric currents flowing through first DC-DC converter 41 and second DC-DC converter 42, respectively. In the stepping-down operation mode, the boosting operation mode, and the boosting and stepping-down operation mode, controller 7 may control DC-DC converter unit 4 such that electric currents detected by first current sensor 414 and second current sensor 424 fall within a predetermined range. Thus, the electric currents flowing through first DC-DC converter 41 and second DC-DC converter 42 are limited to a certain level or lower, thereby preventing the generation of an inrush current.

Power supply device 1 may include: second potential detector 52 configured to detect potential P15 at another end of first switch 5; and fourth potential detector 62 configured to detect potential P16 at another end of second switch 6. In the boosting and stepping-down operation mode, controller 7 may determine whether or not first potential P15 detected by second potential detector 52 is equal to or lower than a first reference potential. When first potential P15 is neither equal to nor lower than the first reference potential, controller 7 may determine that first switching element 411 is abnormal due to being fixedly turned off. Controller 7 may determine whether or not second potential P16 detected by fourth potential detector 62 is equal to or lower than a second reference potential. When second potential P16 is neither equal to nor lower than the second reference potential, controller 7 may determine that fourth switching element 422 is abnormal due to being fixedly turned off. Thus, simultaneously with the diagnosis of first switch 5 and second switch, the open failures of first switching element 411 and fourth switching element 422 are detected.

A diagnostic method for power supply device 1 according to an embodiment is a method of diagnosing a power supply device configured to be connected to first DC power supply 2 configured to supply and hold a first voltage and second DC power supply 3 configured to supply and hold a second voltage lower than the first voltage. Power supply device 1 includes: first switch 5 having one end connected to first DC power supply 2; first capacitor 91 connected between another end of first switch 5 and reference potential GND; second switch 6 having one end connected to second DC power supply 3; second capacitor 92 connected between another end of second switch 6 and reference potential GND; and DC-DC converter unit 4 including first DC-DC converter 41 and second DC-DC converter 42 connected in parallel to each other between another end of first switch 5 and another end of second switch 6. The diagnostic method includes: a stepping-down step of, while first switch 5 and second switch 6 are turned on, performing a stepping-down control to simultaneously cause first DC-DC converter 41 and second DC-DC converter 42 to step down a first voltage supplied from first DC power supply 2 to a second voltage and output the second voltage to second DC power supply 3; a boosting step of, while first switch 5 and second switch 6 are turned on, performing a boosting control to simultaneously cause first DC-DC converter 41 and second DC-DC converter 42 to boost the second voltage supplied from second DC power supply 3 to the first voltage and output the first voltage to first DC power supply 2; and a boosting and stepping-down step (diagnosis mode) of, while first switch 5 and second switch 6 are turned off, performing a boosting and stepping-down control to cause first DC-DC converter 41 to step down a voltage of first capacitor 91 and output the stepped down voltage to second capacitor 92, and simultaneously, to cause second DC-DC converter 42 to boost a voltage of second capacitor 92 and output the voltage to first capacitor 91.

In the diagnosis mode, while first switch 5 and second switch 6 are turned off, first DC-DC converter 41 steps down the voltage of first capacitor 91 and outputs the stepped down voltage to second capacitor 92, and simultaneously, second DC-DC converter 42 boosts the voltage of second capacitor 92 and outputs the boosted voltage to first capacitor 91. When the turning-off performance of first switch 5 is normal, potential difference V5 between both ends of first switch 5 increases in a short time. When the turning-off performance of second switch 6 is normal, potential difference V6 between both ends of second switch 6 increases in a short time. As a result, the turning-off performance of first switch 5 and the turning-off performance of second switch 6 are diagnosed at the same time in a shorter time than in the prior art.

In the boosting and stepping-down step, after the boosting and stepping-down control, it is determined whether or not first potential difference V5 detected by the first potential-difference detector is greater than the first reference potential difference. When first potential difference V5 is greater than the first reference potential difference, it is determined that first switch 5 is normal, meanwhile, when first potential difference V5 is not greater than the first reference potential difference, it is determined that first switch 5 is abnormal and cannot be turned off. Furthermore, in the boosting and stepping-down step, after the boosting and stepping-down control, it is determined whether or not second potential difference V6 detected by the second potential-difference detector is greater than the second reference potential difference. When second potential difference V6 is greater than the second reference potential difference, it is determined that second switch 6 is normal, meanwhile, when second potential difference V6 is not greater than the second reference potential difference, it is determined that second switch 6 is abnormal and cannot be turned off.

The power supply device and the diagnostic method for the power supply device according to the present disclosure have been described above based on the embodiment, but the present invention is not limited to the embodiment. Various modifications to the embodiment that could be conceived by those skilled in the art and other embodiments configured by combinations of some of constituent in the embodiment are included within the present disclosure, without departing from the spirit of the present disclosure.

For example, the DC-DC converters included in the power supply device are not limited to the circuits illustrated in FIG. 2, but may be other circuits. Hereinafter, power supply devices according to modifications that include different DC-DC converters will be described.

Figure 7:
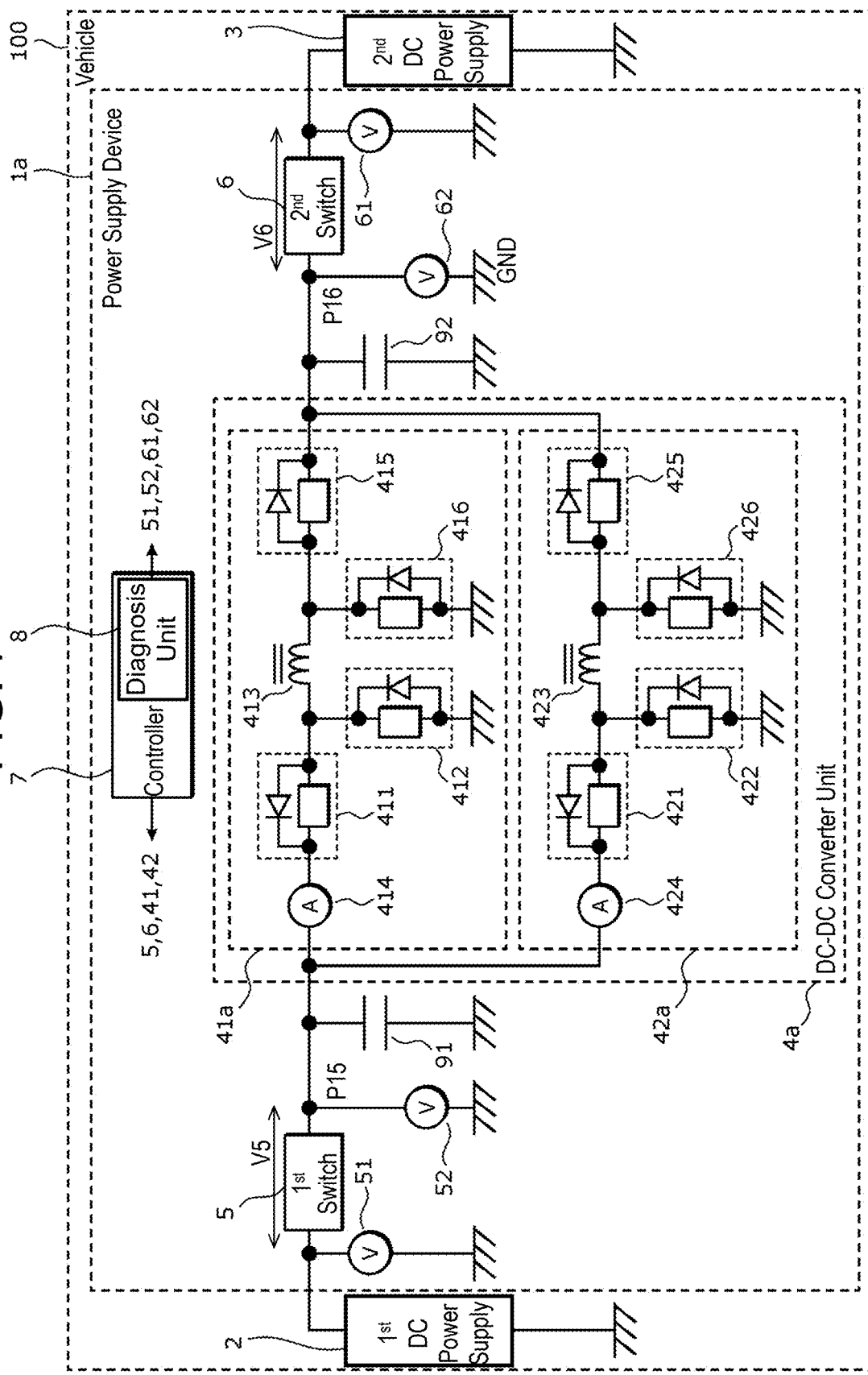
FIG. 7 is a block diagram illustrating the configuration of a power supply device according to Modification 1 of the embodiment.

FIG. 7 is a block diagram of power supply device 1a according to Modification 1 of the embodiment. Power supply device 1a according to this modification has a configuration in which DC-DC converter unit 4 of power supply device 1 according to the embodiment illustrated in FIG. 2 is replaced by DC-DC converter unit 4a according to this modification. Points different from the embodiment will be described below.

DC-DC converter unit 4a includes first DC-DC converter 41a and second DC-DC converter 42a which are connected in parallel to each other.

In addition to constituents of first DC-DC converter 41 according to the embodiment, first DC-DC converter 41a further includes: fifth switching element 415 connected in series with first reactor 413; and sixth switching element 416 connected between reference potential GND and node J41a at which fifth switching element 415 and first reactor 413 are connected in series with each other. In addition to constituents of second DC-DC converter 42 according to the embodiment, second DC-DC converter 42a further includes: seventh switching element 425 connected in series with second reactor 423; and eighth switching element 426 connected between reference potential GND and node point J42a at which seventh switching element 425 and second reactor 423 are connected in series with each other.

Fifth switching element 415, sixth switching element 416, seventh switching element 425, and eighth switching element 426 are, e.g., all N-channel MOSFETs each including a body diode. The body diode includes an anode on the source electrode side of the switching element and a cathode on the drain electrode side thereof.

Under the control of controller 7, first DC-DC converter 41a performs not only the stepping-down operation but also the boosting operation when first DC power supply 2 charges second DC power supply 3. In the case of performing the stepping-down operation, the same operation as that of DC-DC converter unit 4 according to the embodiment is performed while fifth switching element 415 is turned on and sixth switching element 416 is turned off.

In contrast, in the case of performing the boosting operation, while first switching element 411 is maintained to be turned on and second switching element 412 is maintained to be turned off, fifth switching element 415 is turned off and sixth switching element 416 is turned on, and thereby, an electric current flows from first DC power supply 2 to reference potential GND via first current sensor 414, first switching element 411, first reactor 413, and sixth switching element 416, thereby storing energy in first reactor 413. Further, while first switching element 411 is maintained to be turned on and second switching element 412 is maintained to be turned off, fifth switching element 415 is turned on and sixth switching element 416 is turned off thereby releasing the energy stored in first reactor 413 and causing an electric current to flow from first DC power supply 2 to second DC power supply 3 via first current sensor 414, first switching element 411, first reactor 413, and fifth switching element 415. These two states are alternately repeated.

First DC-DC converter 41a is configured to also perform not only the boosting operation but also the stepping-down operation under the control of controller 7 when second DC power supply 3 charges DC power supply 2. In the case of performing the boosting operation, the same operation as that of the DC-DC converter unit 4 according to the embodiment is performed while fifth switching element 415 is turned on and sixth switching element 416 is turned off.

In contrast, in the case of performing the stepping-down operation, while first switching element 411 is maintained to be turned on and second switching element 412 is maintained to be turned off, fifth switching element 415 is turned on and sixth switching element 416 is turned off, and thereby, an electric current flows from second DC power supply 2 to first DC power supply 2 via fifth switching element 415, first reactor 413, first switching element 411, and first current sensor 414, thereby storing energy in first reactor 413. While first switching element 411 is maintained to be turned on and second switching element 412 is maintained to be turned off, fifth switching element 415 is turned off and sixth switching element 416 is turned on, thereby releasing the energy stored in first reactor 413 and causing an electric current to flow from reference potential GND to first DC power supply 2 via sixth switching element 416, first reactor 413, first switching element 411, and first current sensor 414. These states are alternately repeated.

Similarly to first DC-DC converter 41a, second DC-DC converter 42a is configured to perform not only the stepping-down operation but also the boosting operation under the control of controller 7 when first DC power supply 2 charges second DC power supply 3. Furthermore, as in the case of first DC-DC converter 41a, second DC-DC converter 42a can perform not only the boosting operation but also the stepping-down operation under the control of controller 7 when charging from second DC power supply 3 to first DC power supply 2 is performed.

In power supply device 1a according to this modification, in the stepping-down operation mode, the boosting operation mode, and the boosting and stepping-down operation mode (diagnosis mode), controller 7 operates as follows. In other words, in addition to the operation control in accordance with the embodiment, controller 7 is configured to perform the following operation control.

When the second voltage supplied from second DC power supply 3 is higher than the first voltage supplied from first DC power supply 2, controller 7 performs the following control.

In the stepping-down operation mode, while first switch 5 and second switch 6 are turned on, controller 7 performs the stepping-down control to simultaneously cause first DC-DC converter 41 and second DC-DC converter 42 to step down the second voltage supplied from second DC power supply 3 to the first voltage and output the first voltage to first DC power supply 2.

In the boosting operation mode, while first switch 5 and second switch 6 are turned on, controller 7 performs the boosting control to simultaneously cause first DC-DC converter 41 and second DC-DC converter 42 to boost the first voltage supplied from first DC power supply 2 to the second voltage and output the second voltage to second DC power supply 3.

In the boosting and stepping-down operation (diagnosis mode), while first switch 5 and second switch 6 are turned off, controller 7 performs the boosting and stepping-down control to cause first DC-DC converter 41 to step down a voltage of second capacitor 92 and output the stepped down voltage to first capacitor 91 and simultaneously to cause second DC-DC converter 42 to boost a voltage of first capacitor 91 and output the boosted voltage to second capacitor 92. Alternatively, while first switch 5 and second switch 6 are turned off, controller 7 performs the boosting and stepping-down control to cause first DC-DC converter 41 to boost a voltage of first capacitor 91 and output the boosted voltage to second capacitor 92 and simultaneously to cause second DC-DC converter 42 to step down a voltage of second capacitor 92 and output the stepped down voltage to first capacitor 91.

In power supply device 1a of this modification, as in the embodiment, in the boosting and stepping-down operation mode (diagnosis mode), first switch 5 and second switch 6 are turned off, and then, an electric charge stored in first capacitor 91 is released by the stepping-down operation or the boosting operation by first DC-DC converter 41 to decrease the voltage of first capacitor 91, meanwhile, an electric charge stored in second capacitor 92 is released by the boosting operation or the stepping-down operation by second DC-DC converter 42 to decrease the voltage of second capacitor 92.

Hence, compared to the prior art in which the boosting operation or the stepping-down operation by first DC-DC converter 41 and second DC-DC converter 42 are not performed, when the turning-off performance of first switch 5 is normal, potential difference V5 between both ends of first switch 5 increases in a shorter time. When the turning-off performance of second switch 6 is normal, potential difference V6 between both ends of second switch 6 increases in a shorter time. Thus, the turning-off performance of first switch 5 and the turning-off performance of second switch 6 are diagnosed at the same time in a shorter time than in the prior art.

Figure 8:
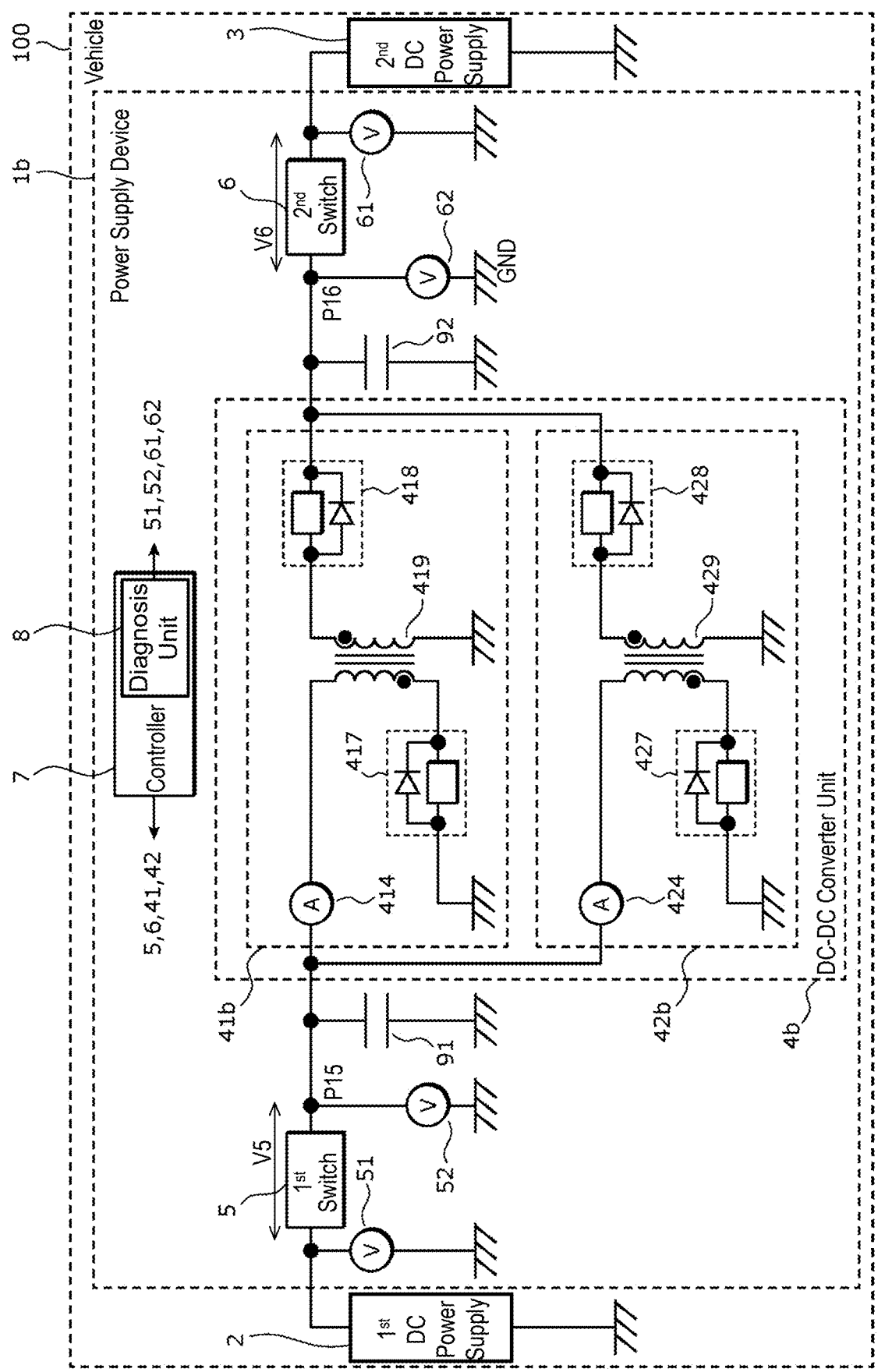
FIG. 8 is a block diagram illustrating the configuration of a power supply device according to Modification 2 of the embodiment.

FIG. 8 is a block diagram of power supply device 1b according to Modification 2 of the embodiment. Power supply device 1b according to this modification has the configuration in which DC-DC converter unit 4 of power supply device 1 according to the embodiment illustrated in FIG. 2 is replaced by DC-DC converter unit 4b according to this modification. Points different from the embodiment will be described below.

DC-DC converter unit 4b includes first DC-DC converter 41b and second DC-DC converter 42b which are connected in parallel to each other.

First DC-DC converter 41b includes first current sensor 414, ninth switching element 417, tenth switching element 418, and first transformer 419. First current sensor 414, a primary coil of first transformer 419, and ninth switching element 417 are connected in series to one another. A secondary coil of first transformer 419 and tenth switching element 418 are connected in series to each other.

Second DC-DC converter 42b includes second current sensor 424, eleventh switching element 427, twelfth switching element 428, and second transformer 429. Second current sensor 424, a primary coil of second transformer 429, and eleventh switching element 427 are connected in series to one another. A secondary coil of second transformer 429 and twelfth switching element 428 are connected in series to each other.

Ninth switching element 417, tenth switching element 418, eleventh switching element 427, and twelfth switching element 428 are, e.g., all N-channel MOSFETs each including a body diode. The body diode includes an anode on the source electrode side of the switching element and a cathode on the drain electrode side thereof.

Under the control of controller 7, first DC-DC converter 41b performs a boosting and stepping-down operation when first DC power supply 2 charges second DC power supply 3. The boosting operation or the stepping-down operation performed at this moment is determined by, e.g., the winding turn ratio of the coils of first transformer 419 and an on-duty of a control signal from controller 7 to ninth switching element 417.

Specifically, upon causing first DC power supply 2 to charge second DC power supply 3, ninth switching element 417 performs a switching operation in accordance with the control of controller 7 to step down or boost the DC voltage of first DC power supply 2 to charge second DC power supply 3. Specifically, as an example, the turning on of ninth switching element 417 causes an electric current to flow from first DC power supply 2 to reference potential GND via first current sensor 414, the primary coil of first transformer 419, and ninth switching element 417, thereby storing energy in first transformer 419. The turning off of ninth switching element 417 releases the energy stored in first transformer 419, and thereby an electric current flows from reference potential GND to second DC power supply 3 via the secondary coil of first transformer 419 and the body diode of tenth switching element 418. These states are alternately repeated.

Under the control of controller 7, first DC-DC converter 41b performs a boosting and stepping-down operation when second DC power supply 3 charges first DC power supply 2. The boosting operation or the stepping-down operation at this moment is determined by, e.g., the winding turn ratio of a coil of first transformer 419 and an on-duty of a control signal from controller 7 to tenth switching element 418.

Specifically, upon causing second DC power supply 3 charges first DC power supply 2, tenth switching element 418 performs a switching operation in accordance with the control of controller 7 to boost or step down the DC voltage of second DC power supply 3 to charge first DC power supply 2. Specifically, as an example, the turning on of tenth switching element 418 causes an electric current to flow from second DC power supply 3 to reference potential GND via tenth switching element 418 and the secondary coil of first transformer 419, thereby storing energy in first transformer 419. The turning off of tenth switching element 418 releases the energy stored in first transformer 419, and thereby, an electric current flows from reference potential GND to first DC power supply 2 via the body diode of ninth switching element 417, the primary coil of first transformer 419, and first current sensor 414. These states are alternately repeated.

Under the control of controller 7, second DC-DC converter 42b performs a boosting and stepping-down operation when first DC power supply 2 charges second DC power supply 3. The boosting operation or the stepping-down operation performed at this moment is determined by, e.g., the winding turn ratio of the coil of second transformer 429 and the on-duty of a control signal from controller 7 to eleventh switching element 427.

Specifically, upon causing first DC power supply 2 charges second DC power supply 3, eleventh switching element 427 performs a switching operation in accordance with the control of controller 7 to boost or step down the DC voltage of first DC power supply 2 to charge second DC power supply 3. Specifically, as an example, the turning on of eleventh switching element 427 causes an electric current to flow from first DC power supply 2 to reference potential GND via second current sensor 424, the primary coil of second transformer 429, and eleventh switching element 427, thereby storing energy in second transformer 429. The turning off of eleventh switching element 427 releases the energy stored in second transformer 429, and thereby an electric current flows from reference potential GND to second DC power supply 3 via the secondary coil of second transformer 429 and the body diode of twelfth switching element 428. These states are alternately repeated.

Under the control of controller 7, second DC-DC converter 42*b* performs a boosting and stepping-down operation when charging from second DC power supply 3 to first DC power supply 2 is performed. The boosting operation of the stepping-down operation performed at this moment is determined by, e.g., the winding turn ratio of the coil of second transformer 429 and the on-duty of a control signal from controller 7 to twelfth switching element 428.

Specifically, upon causing second DC power supply 3 charges first DC power supply 2, twelfth switching element 428 performs a switching operation in accordance with the control by controller 7 to boost or step down the DC voltage of second DC power supply 3 to charge first DC power supply 2. Specifically, as an example, the turning on of twelfth switching element 428 causes an electric current to flow from second DC power supply 3 to reference potential GND via twelfth switching element 428 and the secondary coil of second transformer 429, thereby storing energy in second transformer 429. The turning off of twelfth switching element 428 releases the energy stored in second transformer 429, and thereby an electric current flows from reference potential GND to first DC power supply 2 via the body diode of eleventh switching element 427, the primary coil of second transformer 429, and second current sensor 424. These states are alternately repeated.

In power supply device 1*b* of this modification, controller 7 is configured to perform the following operation control. In other words, in the stepping-down operation mode or the boosting operation mode, while first switch 5 and second switch 6 are turned on, controller 7 performs the boosting control or the stepping-down control to simultaneously cause first DC-DC converter 41 and second DC-DC converter 42 to boost or step down the first voltage supplied from first DC power supply 2 to the second voltage and output the second voltage to second DC power supply 3. Alternatively, while first switch 5 and second switch 6 are turned on, controller 7 performs the boosting control or the stepping-down control to simultaneously cause first DC-DC converter 41 and second DC-DC converter 42 to boost or step down the second voltage supplied from second DC power supply 3 to the first voltage and output the first voltage to first DC power supply 2.

In the boosting and stepping-down operation (diagnosis mode), while first switch 5 and second switch 6 are turned off, controller 7 performs the boosting and stepping-down control to cause first DC-DC converter 41 to boost or step down the voltage of first capacitor 91 and output the boosted or stepped down voltage to second capacitor 92, and simultaneously to cause second DC-DC converter 42 to boost or step down the voltage of second capacitor 92 and output the boosted or stepped down voltage to first capacitor 91. Alternatively, while first switch 5 and second switch 6 are turned off, controller 7 performs the boosting and stepping-down control to cause first DC-DC converter 41 to boost or step down the voltage of second capacitor 91 and output the boost or stepped down voltage to first capacitor 91, and simultaneously to cause second DC-DC converter 42 to boost or step down the voltage of first capacitor 91 and output the boost or stepped down voltage to second capacitor 92.

According to power supply device 1*b* of this modification, similarly to the embodiment, in the boosting and stepping-down operation mode (diagnosis mode), first switch 5 and second switch 6 are turned off, and then an electric charge stored in first capacitor 91 is released by the stepping-down operation or the boosting operation by first DC-DC converter 41 to decrease the voltage of first capacitor 91, meanwhile, an electric charge stored in second capacitor 92 is released by the boosting operation or the stepping-down operation by second DC-DC converter 42 to decrease the voltage of second capacitor 92.

Hence, compared to the prior art in which the boosting operation or the stepping-down operation by first DC-DC converter 41 and second DC-DC converter 42 are not performed, when the turning-off performance of first switch 5 is normal, potential difference V5 between both ends of first switch 5 increases in a shorter time, and, when the turning-off performance of second switch 6 is normal, potential difference V6 between both ends of second switch 6 increases in a shorter time. Thus, the turning-off performance of first switch 5 and the turning-off performance of second switch 6 are diagnosed at the same time in a shorter time than in the prior art.

Figure 9:
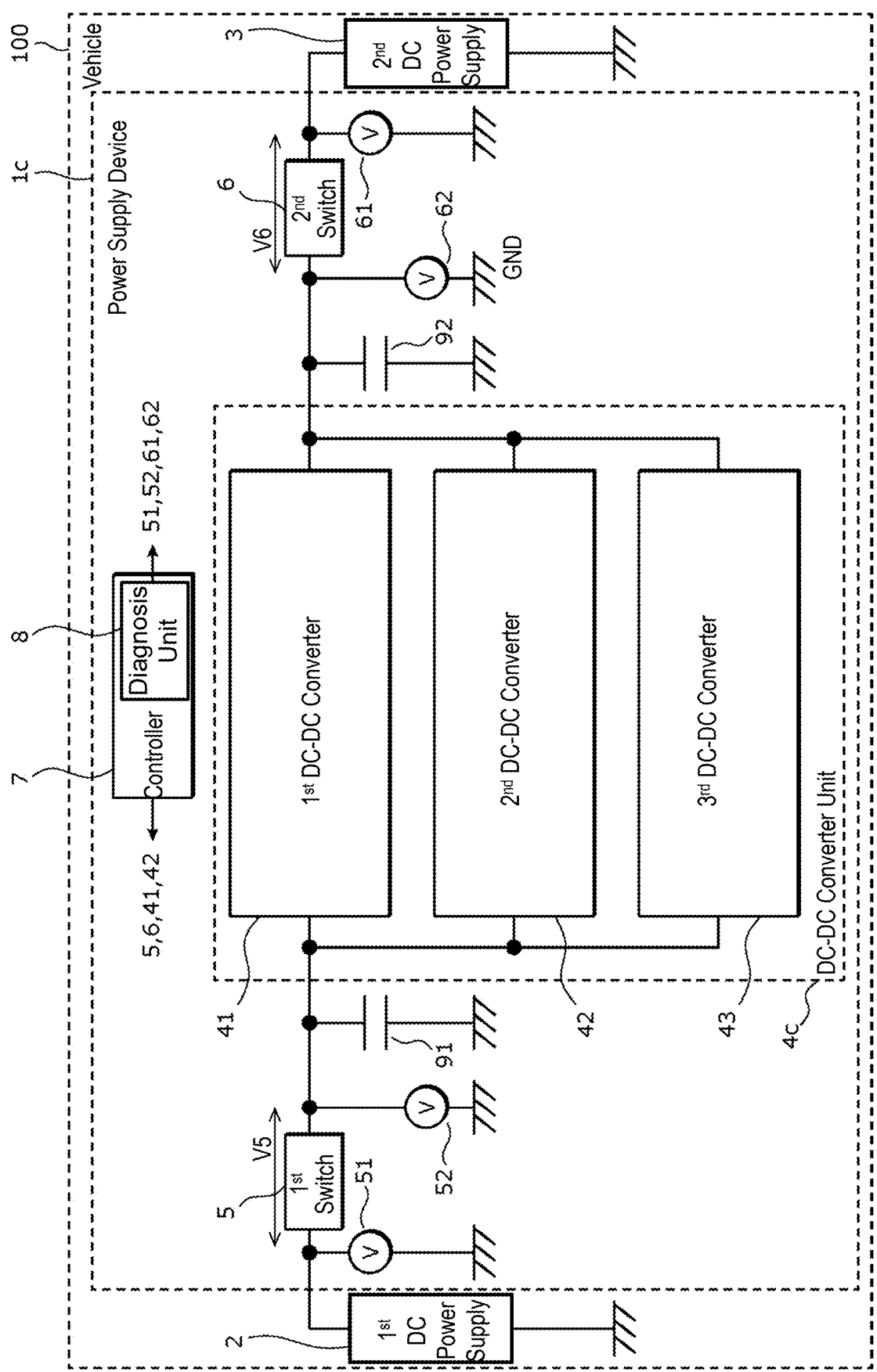
FIG. 9 is a block diagram of a power supply device according to Modification 3 of the embodiment.

Alternatively, the DC-DC converter included in the power supply device according to the present disclosure is not limited to the embodiment including two DC-DC converters connected in parallel to each other, but may include three or more DC-DC converters as illustrated in FIG. 9.

FIG. 9 is a block diagram of power supply device 1*c* according to Modification 3 of the embodiment. Power supply device 1*c* according to this modification has the configuration in which DC-DC converter unit 4 of power supply device 1 according to the embodiment illustrated in FIG. 2 is replaced by DC-DC converter unit 4*c* according to the present modification. Points different from the embodiment will be mainly described below.

DC-DC converter unit 4*c* includes first DC-DC converter 41, second DC-DC converter 42, and third DC-DC converter 43 which are connected in parallel to one another. Details of the configuration of third DC-DC converter 43 may be the same as those of the configuration of first DC-DC converter 41 illustrated in FIG. 2, or may be the same as those of the configuration of first DC-DC converter 41*a* according to Modification 1 illustrated in FIG. 7, or may be the same as those of the configuration of another type of a circuit.

In addition to the operation control in the embodiment, power supply device 1*c* according to this modification is configured to perform the following operation control.

Upon causing the first voltage supplied from first DC power supply 2 to charge second DC power supply 3, while first switch 5 and second switch 6 are turned on, controller 7 performs control to simultaneously cause first DC-DC converter 41, second DC-DC converter 42, and third DC-DC converter 43 to boost or step down the first voltage supplied from first DC power supply 2 to the second voltage and output the second voltage to second DC power supply 3.

Upon causing the second voltage supplied from second DC power supply 3 to charge first DC power supply 2, while first switch 5 and second switch 6 are turned on, controller 7 performs control to simultaneously cause first DC-DC converter 41, second DC-DC converter 42, and third DC-DC converter 43 to boost or step down the second voltage supplied from second DC power supply 3 to the first voltage and output the first voltage to first DC power supply 2.

In the boosting and stepping-down operation (diagnosis mode), while first switch 5 and second switch 6 are turned off, controller 7 performs control to cause one or two of first DC-DC converter 41 to third DC-DC converter 43 to boost or step down a voltage of first capacitor 91 and output the boost or stepped down voltage to second capacitor 92, and simultaneously to cause the remaining two or one of the DC-DC converters to boost or step down the voltage of second capacitor 92 and output the boosted or stepped down voltage to first capacitor 91.

Thus, after first switch 5 and second switch 6 are turned off, an electric charge stored in first capacitor 91 is released by the operation by one or two of the DC-DC converters to decrease a voltage of first capacitor 91, meanwhile, an electric charge stored in second capacitor 92 is released by the operation by the remaining two or one of the DC-DC converters to decrease a voltage of second capacitor 92.

Hence, compared to the prior art in which an operation by a DC-DC converter is not performed, when the turning-off performance of first switch 5 is normal, potential difference V5 between both ends of first switch 5 increases in a shorter time, and, when the turning-off performance of second switch 6 is normal, potential difference V6 between both ends of second switch 6 increases in a shorter time. Thus, the turning-off performance of first switch 5 and the turning-off performance of second switch 6 are diagnosed at the same time in a shorter time than in the prior art.

INDUSTRIAL APPLICABILITY

A power supply device according to the present disclosure is usable as a power supply device connected between two DC power supplies and configured to convert a voltage, particularly as a power supply device capable of diagnosing the turning-off performance of switches each connected between a corresponding one of two DC power supplies and the power supply device in a shorter time than in the prior art, for example, as a voltage converter installed in a vehicle and connected between a battery and an electric double layer capacitor as its backup.

REFERENCE MARKS IN DRAWINGS 1, 1a-1c power supply device
2 first DC power supply
3 second DC power supply
4, 4a-4c DC-DC converter unit
41, 41a, 41b first DC-DC converter
411 first switching element
412 second switching element
413 first reactor
414 first current sensor
415 fifth switching element
416 sixth switching element
417 ninth switching element
418 tenth switching element
419 first transformer
42, 42a, 42b second DC-DC converter
421 third switching element
422 fourth switching element
423 second reactor
424 second current sensor
425 seventh switching element
426 eighth switching element
427 eleventh switching element
428 twelfth switching element
429 second transformer
43 third DC-DC converter
5 first switch
51 first potential detector
52 second potential detector
6 second switch
61 third potential detector
62 fourth potential detector
7 controller
8 diagnosis unit
91 first capacitor
92 second capacitor
100 vehicle

The invention claimed is:

1. A power supply device configured to be connected to a first direct-current (DC) power supply and a second DC power supply, the first DC power supply being configured to supply and hold a first voltage, the second DC power supply being configured to supply and hold a second voltage, the second voltage being lower than the first voltage, the power supply device comprising:
    a first switch having one end being configured to be connected to the first DC power supply;
    a first capacitor connected between another end of the first switch and a reference potential;
    a second switch having one end configured to be connected to the second DC power supply;
    a second capacitor connected between another end of the second switch and the reference potential;
    a first DC-DC converter connected between the another end of the first switch and the another end of the second switch;
    a second DC-DC converter connected in parallel to the first DC-DC converter between the another end of the first switch and the another end of the second switch; and
    a controller configured to control the first switch, the second switch, the first DC-DC converter, and the second DC-DC converter,
    wherein the controller includes:
        a stepping-down operation mode in which, while the first switch and the second switch are turned on, a stepping-down control is performed to simultaneously cause the first DC-DC converter and the second DC-DC converter to step down the first voltage supplied from the first DC power supply to the second voltage and output the second voltage to the second DC power supply;
        a boosting operation mode in which, while the first switch and the second switch are turned on, a boosting control is performed to simultaneously cause the first DC-DC converter and the second DC-DC converter to boost the second voltage supplied from the second DC power supply to the first voltage and output the first voltage to the first DC power supply; and
        a boosting and stepping-down operation mode in which, while the first switch and the second switch are turned off, a boosting and stepping-down control is performed to cause the first DC-DC converter to step down a voltage of the first capacitor and output the stepped down voltage to the second capacitor, and simultaneously, to cause the second DC-DC converter to boost a voltage of the second capacitor and output the boosted voltage to the first capacitor.

2. The power supply device according to claim 1, further comprising:
    a first potential-difference detector configured to detect a first potential difference between both ends of the first switch; and
    a second potential-difference detector configured to detect a second potential difference between both ends of the second switch, wherein, in the boosting and stepping-down operation mode, after the boosting and stepping-down control, the controller is configured to:
  determine whether or not the first potential difference detected by the first potential-difference detector is greater than a first reference potential difference;
  when the first potential difference is greater than the first reference potential difference, determine that the first switch is normal;
  determine whether or not the second potential difference detected by the second potential-difference detector is greater than a second reference potential difference; and
  when the second potential difference is greater than the second reference potential difference, determine that the second switch is normal.

3. The power supply device according to claim 2, wherein, in the boosting and stepping-down operation mode, the controller is configured to:
  when the first potential difference is not greater than the first reference potential difference, determine that the first switch is abnormal; and
  when the second potential difference is not greater than the second reference potential difference, determine that the second switch is abnormal.

4. The power supply device according to claim 2, wherein, in the boosting and stepping-down operation mode, the controller is configured to cause the first DC-DC converter to perform a stepping-down and cause the second DC-DC converter to perform a boosting for a predetermined period of time after turning off the first switch and the second switch.

5. The power supply device according to claim 1, wherein the first DC-DC converter includes:
  a first switching element and a first reactor connected in series with each other at a first node between the first switch and the second switch; and
  a second switching element connected between the first node and the reference potential, the second switching element including a body diode, and
  wherein the second DC-DC converter includes:
    a third switching element and a second reactor connected in series with each other at a second node between the first switch and the second switch, the third switching element including a body diode; and
    a fourth switching element connected between the second node and the reference potential.

6. The power supply device according to claim 5, wherein, in the boosting and stepping-down operation mode, the controller is configured to perform the boosting and stepping-down control while the second switching element and the third switching element are continuously turned off.

7. The power supply device according to any claim 1, further comprising
  a current sensor configured to detect an electric current flowing through one of the first DC-DC converter and the second DC-DC converter,
  wherein, in the stepping-down operation mode, the boosting operation mode, and the boosting and stepping-down operation mode, the controller is configured to control the one of the first DC-DC converter and the second DC-DC converter to cause the electric current detected by the current sensor to fall within a predetermined range.

8. The power supply device according to claim 5, further comprising:
  a first potential detector configured to detect a potential of the another end of the first switch; and
  a second potential detector configured to detect a potential of the another end of the second switch,
  wherein, in the boosting and stepping-down operation mode, the controller is configured to:
    determine whether or not a first potential detected by the first potential detector is equal to or lower than a first reference potential;
    when the first potential is neither equal to nor lower than the first reference potential, determine that the first switching element is abnormal in which the first switching element is fixedly turned off;
    determines whether or not a second potential detected by the second potential detector is equal to or lower than a second reference potential; and
    when the second potential is neither equal to nor lower than the second reference potential, determine that the fourth switching element is abnormal in which the fourth switching element is fixedly turned off.

9. The power supply device according to claim 8, wherein, in the boosting and stepping-down operation mode, the controller is configured to:
  when the first potential is equal to or lower than the first reference potential, determine that the first switching element is normal; and
  when the second potential is equal to or lower than the second reference potential, determine that the fourth switching element is normal.

10. A method of diagnosing a power supply device configured to be connected to a first direct-current (DC) power supply and a second DC power supply, the first DC power supply being configured to supply and hold a first voltage, the second DC power supply being configured to supply and hold a second voltage, the second voltage being lower than the first voltage, the method comprising:
  preparing a power supply device including
    a first switch having one end connected to the first DC power supply,
    a first capacitor connected between another end of the first switch and a reference potential,
    a second switch having one end connected to the second DC power supply,
    a second capacitor connected between another end of the second switch and the reference potential,
    a first DC-DC converter connected between the another end of the first switch and the another end of the second switch, and
    a second DC-DC converter connected between the another end of the first switch and the another end of the second switch,
  wherein the power supply device is configured to
    while the first switch and the second switch are turned on, perform a stepping-down control to simultaneously cause the first DC-DC converter and the second DC-DC converter to step down the first voltage supplied from the first DC power supply to the second voltage and output the second voltage to the second DC power supply, and
    while the first switch and the second switch are turned on, perform a boosting control to simultaneously cause the first DC-DC converter and the second DC-DC converter to boost the second voltage supplied from the second DC power supply to the first voltage and output the first voltage to the first DC power supply; and while the first switch and the second switch are turned off, performing a boosting and stepping-down control to cause the first DC-DC converter to step down a voltage of the first capacitor and output the stepped down voltage to the second capacitor, and simultaneously to cause the second DC-DC converter to boost a voltage of the second capacitor and output the boosted voltage to the first capacitor.

11. The method according to claim 10,
wherein the power supply device further includes:
a first potential-difference detector configured to detect a potential difference between both ends of the first switch; and
a second potential-difference detector configured to detect a potential difference between both ends of the second switch, and
wherein the method further comprises:
after the performing the boosting and stepping-down control, determining whether or not a first potential difference detected by the first potential-difference detector is greater than a first reference potential difference;
when the first potential difference is greater than the first reference potential difference, determining that the first switch is normal;
after the performing the boosting and stepping-down control, determining whether or not a second potential difference detected by the second potential-difference detector is greater than a second reference potential difference; and
when the second potential difference is greater than the second reference potential difference, determining that the second switch is normal.

12. The method according to claim 11, further comprising:
when the first potential difference is not greater than the first reference potential difference, determining that the first switch is abnormal; and
when the second potential difference is not greater than the second reference potential difference, determining that the second switch is abnormal.

13. A method of diagnosing a power supply device configured to be connected to a first direct-current (DC) power supply and a second DC power supply, the first DC power supply being configured to supply and hold a first voltage, the second DC power supply being configured to supply and hold a second voltage, the second voltage being lower than the first voltage, the method comprising:
preparing a power supply device including
a first switch having one end connected to the first DC power supply,
a first capacitor connected between another end of the first switch and a reference potential,
a second switch having one end connected to the second DC power supply,
a second capacitor connected between another end of the second switch and the reference potential,
a first DC-DC converter connected between the another end of the first switch and the another end of the second switch, and
a second DC-DC converter connected between the another end of the first switch and the another end of the second switch; and
while the first switch and the second switch are turned off, performing a boosting and stepping-down control to cause the first DC-DC converter to step down a voltage of the first capacitor and output the stepped down voltage to the second capacitor, and simultaneously to cause the second DC-DC converter to boost a voltage of the second capacitor and output the boosted voltage to the first capacitor.

14. The method according to claim 13,
wherein the power supply device further includes:
a first potential-difference detector configured to detect a potential difference between both ends of the first switch; and
a second potential-difference detector configured to detect a potential difference between both ends of the second switch, and
wherein the method further comprises:
after the performing the boosting and stepping-down control, determining whether or not a first potential difference detected by the first potential-difference detector is greater than a first reference potential difference;
when the first potential difference is greater than the first reference potential difference, determining that the first switch is normal;
after the performing the boosting and stepping-down control, determining whether or not a second potential difference detected by the second potential-difference detector is greater than a second reference potential difference; and
when the second potential difference is greater than the second reference potential difference, determining that the second switch is normal.

15. The method according to claim 14, further comprising:
when the first potential difference is not greater than the first reference potential difference, determining that the first switch is abnormal; and
when the second potential difference is not greater than the second reference potential difference, determining that the second switch is abnormal.

* * * * *